US012591300B2

(12) United States Patent　　　(10) Patent No.:　US 12,591,300 B2
Rekow et al.　　　　　　　　　　　(45) **Date of Patent:　　*Mar. 31, 2026**

(54) LIDAR-BASED IMMERSIVE 3D REALITY CAPTURE SYSTEMS, AND RELATED METHODS AND APPARATUS

(71) Applicant: VELODYNE LIDAR USA, INC., San Jose, CA (US)

(72) Inventors: Mathew Noel Rekow, Almeda, CA (US); David S. Hall, Oakland, CA (US); Sunil Kumar Singh Khatana, Sunnyvale, CA (US); Sharath Nair, San Jose, CA (US); John Kua, San Jose, CA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 955 days.

This patent is subject to a terminal disclaimer.

(21) Appl. No.: 17/710,956

(22) Filed: Mar. 31, 2022

(65) Prior Publication Data

US 2022/0326763 A1　　Oct. 13, 2022

Related U.S. Application Data

(60) Provisional application No. 63/278,998, filed on Nov. 12, 2021, provisional application No. 63/169,180, filed on Mar. 31, 2021.

(51) Int. Cl.
*G01S 7/481*　　　(2006.01)
*G01S 7/4865*　　(2020.01)
　　　(Continued)

(52) U.S. Cl.
CPC ............ *G06F 3/012* (2013.01); *G01S 7/4813* (2013.01); *G01S 7/4865* (2013.01); *G01S 7/497* (2013.01);
　　　(Continued)

(58) Field of Classification Search
CPC ........ G01S 7/4972; G01S 7/479; G01S 17/89; G01S 7/40; G01S 7/52004;
　　　(Continued)

(56) References Cited

U.S. PATENT DOCUMENTS

| 2019/0094981 | A1 | 3/2019 | Bradski et al. |
| 2019/0212450 | A1 | 7/2019 | Steinberg et al. |

(Continued)

FOREIGN PATENT DOCUMENTS

| WO | 2020126123 A2 | 6/2020 |

OTHER PUBLICATIONS

PCT/US2022/022961, "International Search Report and the Written Opinion", Sep. 2, 2022, 14 pages.

(Continued)

*Primary Examiner* — Sanjiv D. Patel
(74) *Attorney, Agent, or Firm* — Kilpatrick Townsend & Stockton LLP

(57) ABSTRACT

LiDAR-based immersive 3D reality capture systems and methods are disclosed. The reality capture system includes a set of LiDAR sensors disposed around an environment and configured to capture one or more events occurring within the environment. The reality capture system also includes a corresponding set of cameras disposed around the environment. Each camera is mounted on a same gimbal with a corresponding LiDAR sensor and has a same optical axis as the corresponding LiDAR sensor. The reality capture system further includes a base station viewpoint generator coupled to the set of LiDAR sensors and the cameras to generate a video feed based on data received from the LiDAR sensors and the cameras. The reality capture system additionally includes a virtual reality device coupled to the base station viewpoint generator to receive and display the video feed generated by the base station viewpoint generator.

24 Claims, 15 Drawing Sheets

(51) Int. Cl.

| | |
|---|---|
| *G01S 7/497* | (2006.01) |
| *G01S 7/51* | (2006.01) |
| *G01S 17/894* | (2020.01) |
| *G06F 3/01* | (2006.01) |

(52) U.S. Cl.
CPC .............. *G01S 7/51* (2013.01); *G01S 17/894*
(2020.01); *G06T 2207/10028* (2013.01)

(58) Field of Classification Search
CPC ......... G06T 2207/30204; G06T 19/006; G06T
2207/10028; G06T 17/00; G06T 19/20;
G06T 7/70; G06T 2215/16; G06T
2207/30252; G06F 3/011; G06F 3/012;
G06V 10/764; G06V 20/17; G06V 40/10;
H04N 23/90; H04N 7/181; H04N 23/695;
B60R 21/00; F16M 11/123
See application file for complete search history.

(56) References Cited

U.S. PATENT DOCUMENTS

| | | | |
|---|---|---|---|
| 2019/0361126 A1 | 11/2019 | Abari et al. | |
| 2020/0065583 A1 | 2/2020 | Loveland et al. | |
| 2020/0200872 A1 | 6/2020 | Böckem et al. | |
| 2020/0353878 A1* | 11/2020 | Briggs | G01C 21/20 |
| 2021/0325520 A1 | 10/2021 | Cai et al. | |
| 2022/0050191 A1 | 2/2022 | Zhu et al. | |
| 2022/0326763 A1 | 10/2022 | Rekow et al. | |
| 2023/0194684 A1 | 6/2023 | Wang et al. | |
| 2023/0204737 A1 | 6/2023 | Jain et al. | |

OTHER PUBLICATIONS

U.S. Appl. No. 17/561,380, "Non-Final Office Action", Mar. 27, 2025, 20 pages.
U.S. Appl. No. 17/561,380, "Final Office Action", Oct. 23, 2025, 19 pages.

* cited by examiner

100

NIR (905nm)

Visible (400-700 nm)

<u>900</u>

Base-station viewpoint generator 980 customized video feed

Predict & track [ pose , orientation , zoom level , metadata ]

Capture user preferences capture device inputs

990

600

1

LIDAR-BASED IMMERSIVE 3D REALITY CAPTURE SYSTEMS, AND RELATED METHODS AND APPARATUS

CROSS REFERENCE TO RELATED APPLICATIONS

This application claims the priority and benefit under 35 U.S.C. § 119(e) of U.S. Provisional Patent Application No. 63/278,998, titled "LIDAR-Based Immersive 3D Reality Capture Systems, and Related Methods and Apparatus" filed on Nov. 12, 2021, and of U.S. Provisional Patent Application No. 63/169,180, titled "LIDAR-Based Immersive 3D Reality Capture Systems, and Related Methods and Apparatus" filed on Mar. 31, 2021, each of which is hereby incorporated by reference herein in its entirety.

FIELD OF TECHNOLOGY

The present disclosure relates generally to light detection and ranging ("LiDAR" or "LIDAR") technology and, more specifically, to immersive 3D reality capture systems implemented using LiDAR technology.

BACKGROUND

Light detection and ranging ("LiDAR") systems measure the attributes of their surrounding environments (e.g., shape of a target, contour of a target, distance to a target, etc.) by illuminating the target with laser light and measuring the reflected light with sensors. Differences in laser return times and/or wavelengths can then be used to make digital, three-dimensional ("3D" representations of a surrounding environment. LiDAR technology may be used in various applications including autonomous vehicles, advanced driver assistance systems, mapping, security, surveying, robotics, geology and soil science, agriculture, and unmanned aerial vehicles, airborne obstacle detection (e.g., obstacle detection systems for aircraft), etc. Depending on the application and associated field of view, multiple channels or laser beams may be used to produce images in a desired resolution. A LiDAR system with greater numbers of channels can generally generate larger numbers of pixels.

In a multi-channel LiDAR device, optical transmitters are paired with optical receivers to form multiple "channels." In operation, each channel's transmitter emits an optical signal (e.g., laser) into the device's environment and detects the portion of the signal that is reflected back to the channel's receiver by the surrounding environment. In this way, each channel provides "point" measurements of the environment, which can be aggregated with the point measurements provided by the other channel(s) to form a "point cloud" of measurements of the environment.

The measurements collected by a LiDAR channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal(s) reflected by the surface.

In some cases, LiDAR measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are LiDAR-based immersive 3D reality capture systems. According to one embodiment, The reality capture system includes a set of LiDAR sensors disposed around an environment and configured to capture one or more events occurring within the environment. The reality capture system also includes a corresponding set of cameras disposed around the environment. Each camera is mounted on a same gimbal with a corresponding LiDAR sensor and has a same optical axis as the corresponding LiDAR sensor. The reality capture system further includes a base station viewpoint generator coupled to the set of LiDAR sensors and the cameras to generate a video feed based on data received from the LiDAR sensors and the cameras. The reality capture system additionally includes a virtual reality device coupled to the base station viewpoint generator to receive and display the video feed generated by the base station viewpoint generator.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
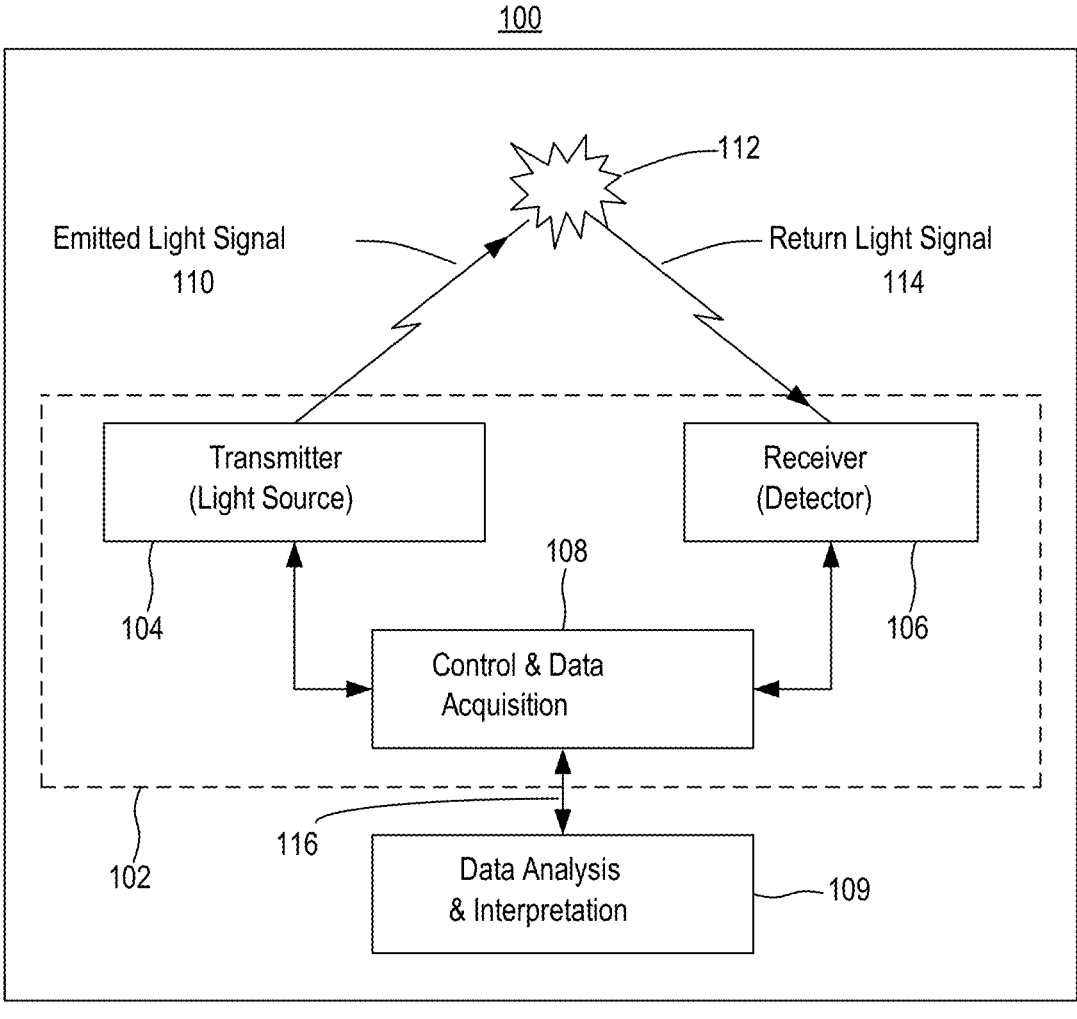
FIG. 1 is an illustration of the operation of an example of a LiDAR system.

While the present disclosure is subject to various modifications and alternative forms, specific embodiments thereof have been shown by way of example in the drawings and will herein be described in detail. The present disclosure is not limited to the particular forms disclosed, but on the contrary, the intention is to cover all modifications, equivalents, and alternatives falling within the spirit and scope of the present disclosure.

DETAILED DESCRIPTION

Systems and methods for LIDAR based, immersive 3D reality capture are disclosed, including methods for detection and/or remediation of extrinsic parameter miscalibration in a LiDAR device (e.g., due to changes in a position and/or an orientation of the LiDAR device). It will be appreciated that, for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Motivation for and Benefits of Some Embodiments

Conventional technology (e.g., image processing and display technology) is capable of generating immersive 3D renderings of virtual environments, such as the renderings produced by popular video gaming platforms. Providing immersive, photorealistic 3D renderings of live action in real environments (e.g., sporting events) would greatly enhance the viewer's experience. However, existing 3D reality capture technology does not capture information about real environments quickly enough or with sufficient detail to enable photorealistic 3D renderings of live action in real environments of any significant scale. In addition, conventional imaging techniques also suffer from occlusion, illumination instability, and certain object surface texture problems.

Accordingly, it would be desirable to provide a high-speed, high-resolution, long-range 3D reality capture system that can scan live action in real environments and produce 3D point clouds with color and depth (distance) information for each pixel. The rendering of such point clouds in real-time can enable immersive, photorealistic augmented reality applications. Described herein are some embodiments of 3D reality capture devices that used pulsed LiDAR sensors, coherent LiDAR (e.g., FMCW LiDAR) sensors, and/or other sensors to perform high-speed, high-resolution, and/or long-range scans of their environments.

Some Examples of LiDAR Systems

A light detection and ranging ("LiDAR") system may be used to measure the shape and contour of the environment surrounding the system. LiDAR systems may be applied to numerous applications including autonomous navigation and aerial mapping of surfaces. In general, a LiDAR system emits light that is subsequently reflected by objects within the environment in which the system operates. In some examples, the LiDAR system can be configured to emit light pulses. The time each pulse travels from being emitted to being received (i.e., time-of-flight, "TOF" or "ToF") may be measured to determine the distance between the LiDAR system and the object that reflects the pulse. In other examples, the LiDAR system can be configured to emit continuous wave (CW) light. The wavelength (or frequency) of the received, reflected light may be measured to determine the distance between the LiDAR system and the object that reflects the light. In some examples, LiDAR systems can measure the speed (or velocity) of objects. The science of LiDAR systems is based on the physics of light and optics.

In a LiDAR system, light may be emitted from a rapidly firing laser. Laser light travels through a medium and reflects off points of surfaces in the environment (e.g., surfaces of buildings, tree branches, vehicles, etc.). The reflected light energy returns to a LiDAR detector where it may be recorded and used to map the environment.

FIG. 1 depicts the operation of a LiDAR system 100, according to some embodiments. In the example of FIG. 1, the LiDAR system 100 includes a LiDAR device 102, which may include a transmitter 104 (e.g., laser) that transmits an emitted light signal 110, a receiver 106 (e.g., photodiode) that detects a return light signal 114, and a control & data acquisition module 108. The LiDAR device 102 may be referred to as a LiDAR transceiver or "channel." In operation, the emitted light signal 110 propagates through a medium and reflects off an object 112, whereby a return light signal 114 propagates through the medium and is received by receiver 106.

The control & data acquisition module 108 may control the light emission by the transmitter 104 and may record data derived from the return light signal 114 detected by the receiver 106. In some embodiments, the control & data acquisition module 108 controls the power level at which the transmitter operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 determines (e.g., measures) characteristics of the return light signal 114 detected by the receiver 106. For example, the control & data acquisition module 108 may measure the intensity of the return light signal 114 using any suitable technique.

A LiDAR transceiver may include one or more optical lenses and/or mirrors (not shown). The transmitter 104 may emit a laser beam having a plurality of pulses in a particular sequence. Design elements of the receiver 106 may include its horizontal field of view (hereinafter, "FOV") and its vertical FOV. One skilled in the art will recognize that the FOV parameters effectively define the visibility region relating to the specific LiDAR transceiver. More generally, the horizontal and vertical FOVs of a LiDAR system may be defined by a single LiDAR device (e.g., sensor) or may relate to a plurality of configurable sensors (which may be exclusively LiDAR sensors or may have different types of sensors). The FOV may be considered a scanning area for a LiDAR system. A scanning mirror and/or rotating assembly may be utilized to obtain a scanned FOV.

The LiDAR system may also include a data analysis & interpretation module 109, which may receive an output via connection 116 from the control & data acquisition module 108 and perform data analysis functions. The connection 116 may be implemented using a wireless or non-contact communication technique.

Figure 2A:
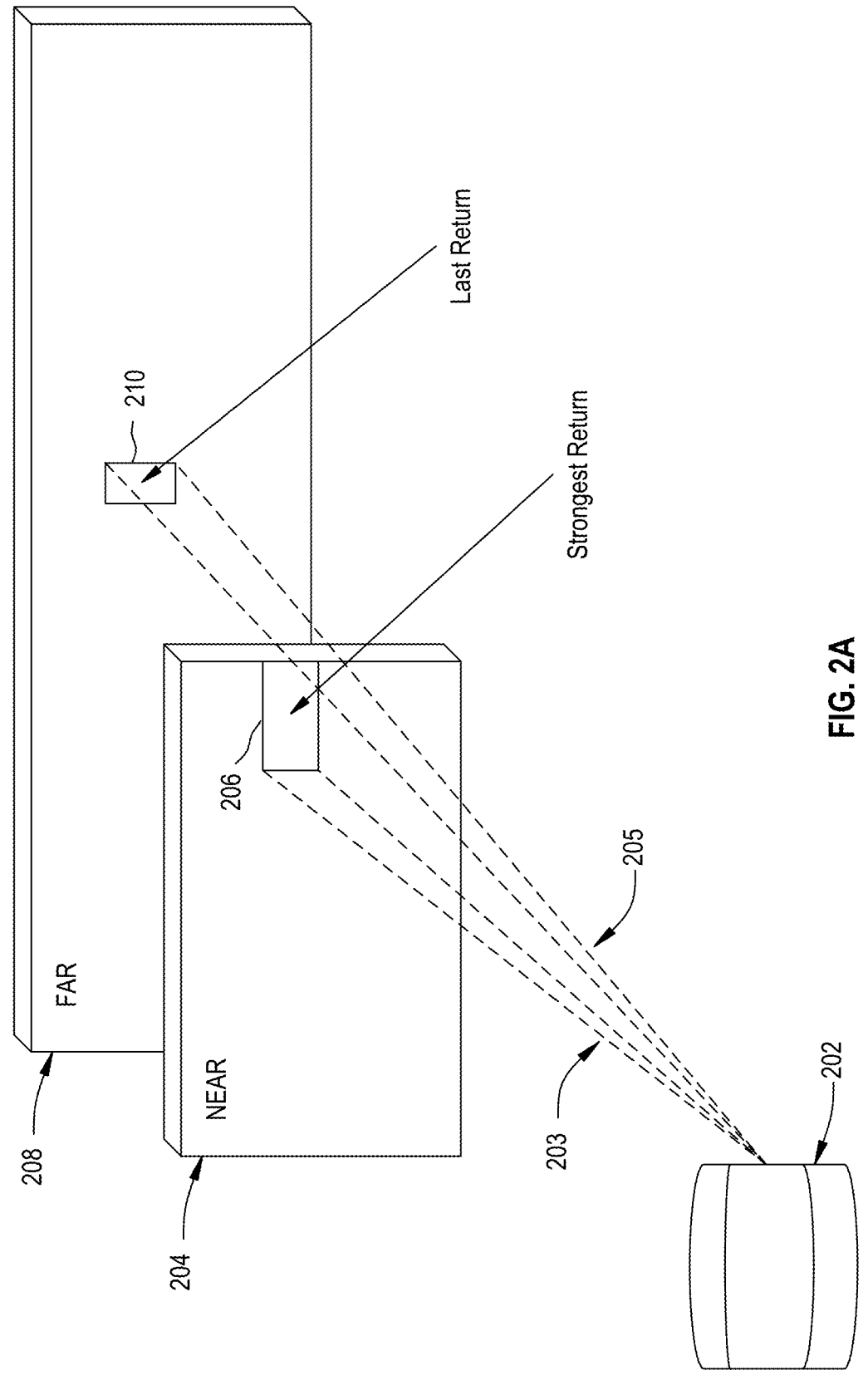
FIG. 2A is another illustration of the operation of an example of a LiDAR system.

FIG. 2A illustrates the operation of a LiDAR system 202, in accordance with some embodiments. In the example of FIG. 2A, two return light signals 203 and 205 are shown. Laser beams generally tend to diverge as they travel through a medium. Due to the laser's beam divergence, a single laser emission may hit multiple objects producing multiple return signals. The LiDAR system 202 may analyze multiple return signals and report one of the return signals (e.g., the strongest return signal, the last return signal, etc.) or more than one (e.g., all) of the return signals. In the example of FIG. 2A, LiDAR system 202 emits a laser in the direction of near wall 204 and far wall 208. As illustrated, the majority of the beam hits the near wall 204 at area 206 resulting in return signal 203, and another portion of the beam hits the far wall 208 at area 210 resulting in return signal 205. Return signal 203 may have a shorter TOF and a stronger received signal strength compared with return signal 205. In both single and multiple return LiDAR systems, it is important that each return signal is accurately associated with the transmitted light signal so that one or more attributes of the object that reflected the light signal (e.g., range, velocity, reflectance, etc.) are correctly calculated.

Some embodiments of a LiDAR system may capture distance data in a two-dimensional ("2D") (e.g., single plane) point cloud manner. These LiDAR systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., detector). Use of a movable (e.g., oscillating) mirror in this manner may enable the LiDAR system to achieve 90-180-360 degrees of azimuth (horizontal) view while simplifying both the system design and manufacturability. Many applications require more data than just a single 2D plane. The 2D point cloud may be expanded to form a three-dimensional ("3D") point cloud, where multiple 2D clouds are used, each pointing at a different elevation (vertical) angle. Design elements of the receiver of the LiDAR system 202 may include the horizontal FOV and the vertical FOV.

Figure 2B:
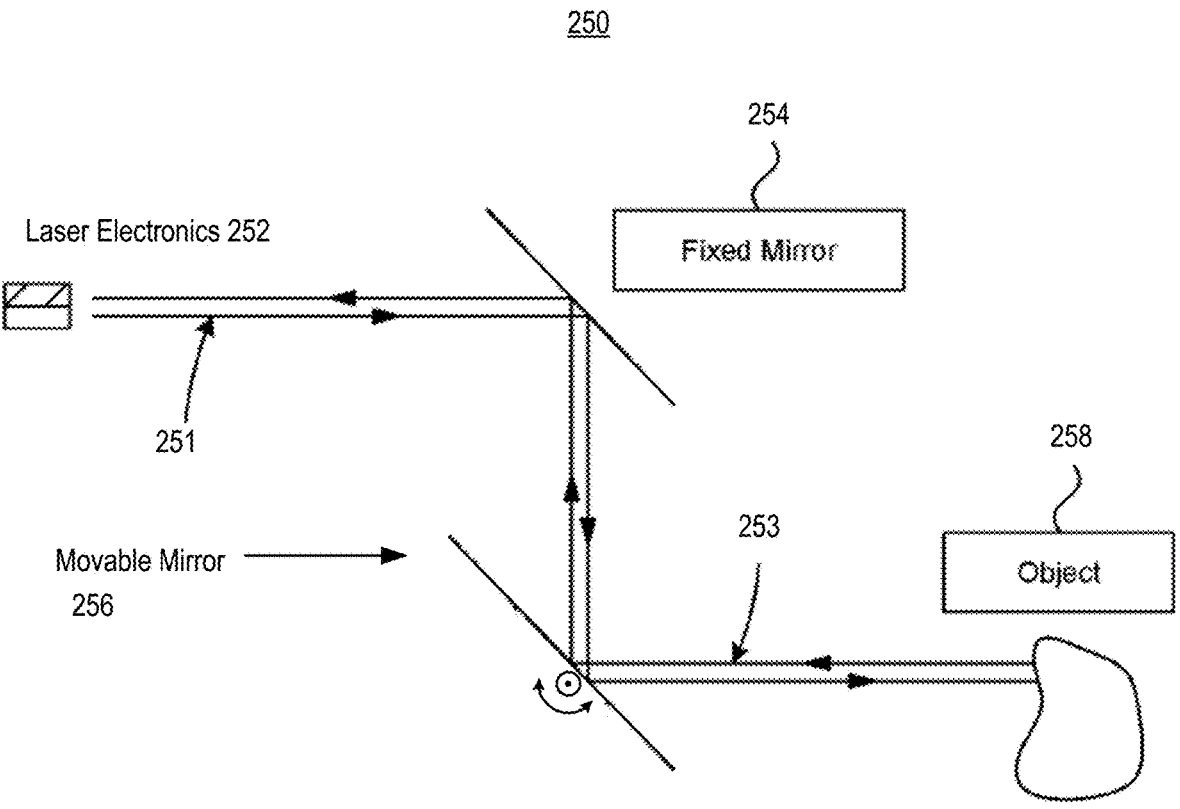
FIG. 2B is an illustration of an example of a LiDAR system with an oscillating mirror.

FIG. 2B depicts a LiDAR system 250 with a movable (e.g., oscillating) mirror, according to some embodiments. In the example of FIG. 2B, the LiDAR system 250 uses a single laser emitter/detector pair combined with a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute).

The LiDAR system 250 may have laser electronics 252, which may include a single light emitter and light detector. The emitted laser signal 251 may be directed to a fixed mirror 254, which may reflect the emitted laser signal 251 to the movable mirror 256. As movable mirror 256 moves (e.g., "oscillates"), the emitted laser signal 251 may reflect off an object 258 in its propagation path. The reflected signal 253 may be coupled to the detector in laser electronics 252 via the movable mirror 256 and the fixed mirror 254. Design elements of the receiver of LiDAR system 250 include the horizontal FOV and the vertical FOV, which defines a scanning area.

Figure 2C:
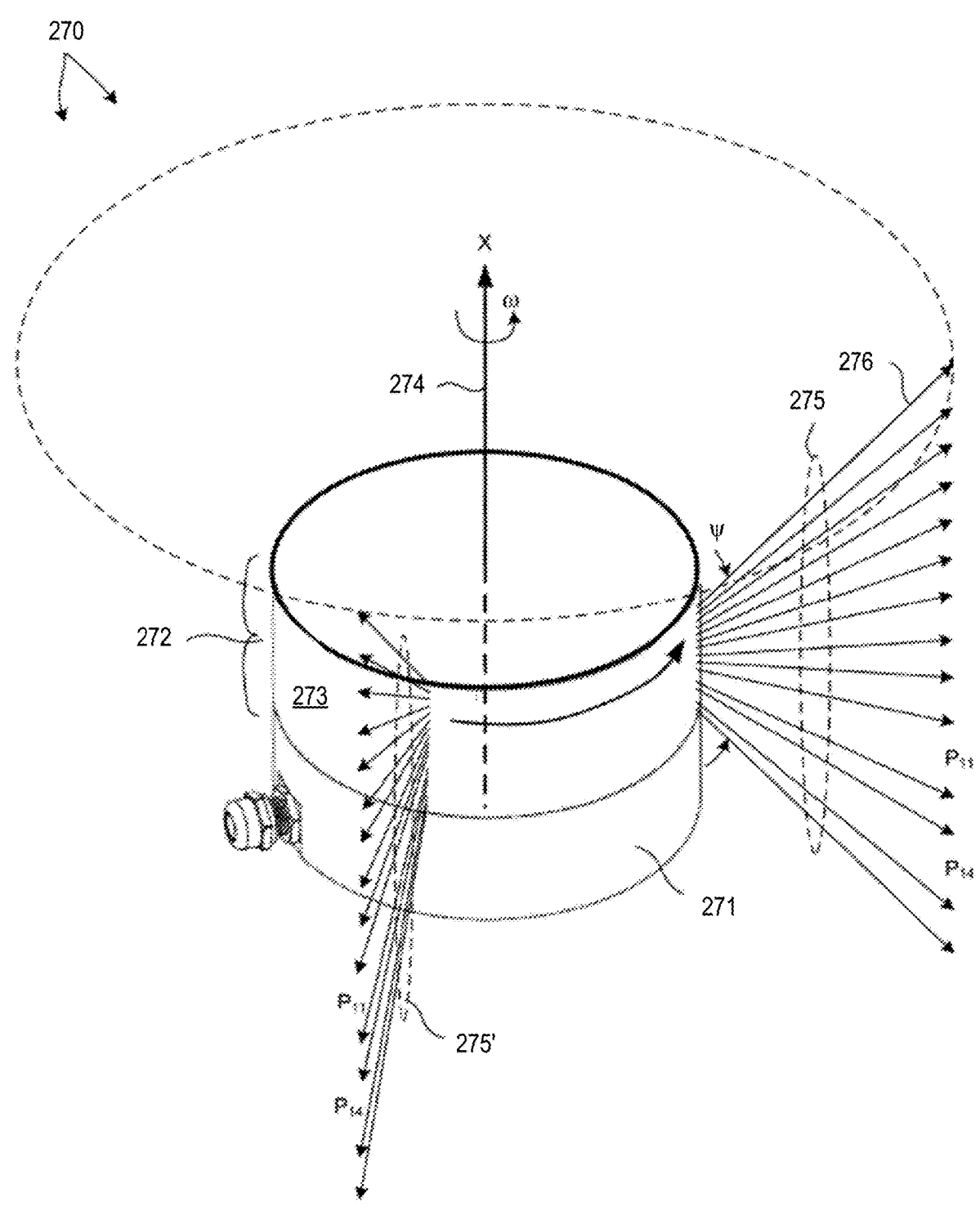
FIG. 2C is an illustration of an example of a three-dimensional ("3D") LiDAR system.

FIG. 2C depicts a 3D LiDAR system 270, according to some embodiments. In the example of FIG. 2C, the 3D LiDAR system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D LiDAR system 270 includes a LiDAR transceiver 102 operable to emit laser beams 276 through the cylindrical shell element 273 of the upper housing 272. In the example of FIG. 2C, each individual arrow in the sets of arrows 275, 275' directed outward from the 3D LiDAR system 270 represents a laser beam 276 emitted by the 3D LiDAR system. Each beam of light emitted from the system 270 may diverge slightly, such that each beam of emitted light forms a cone of illumination light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D LiDAR system 270. The direction of each emitted beam may be determined by the angular orientation ω of the transceiver's transmitter 104 with respect to the system's central axis 274 and by the angular orientation ψ of the transmitter's movable mirror 256 with respect to the mirror's axis of oscillation (or rotation). For example, the direction of an emitted beam in a horizontal dimension may be determined by the transmitter's angular orientation ω, and the direction of the emitted beam in a vertical dimension may be determined by the angular orientation ψ of the transmitter's movable mirror. Alternatively, the direction of an emitted beam in a vertical dimension may be determined the transmitter's angular orientation ω, and the direction of the emitted beam in a horizontal dimension may be determined by the angular orientation ψ of the transmitter's movable mirror. (For purposes of illustration, the beams of light 275 are illustrated in one angular orientation relative to a non-rotating coordinate frame of the 3D LiDAR system 270 and the beams of light 275' are illustrated in another angular orientation relative to the non-rotating coordinate frame.)

The 3D LiDAR system 270 may scan a particular point (e.g., pixel) in its field of view by adjusting the orientation ω of the transmitter and the orientation ψ of the transmitter's movable mirror to the desired scan point (ω, ψ) and emitting a laser beam from the transmitter 104. Likewise, the 3D LiDAR system 270 may systematically scan its field of view by adjusting the orientation ω of the transmitter and the orientation ψ of the transmitter's movable mirror to a set of scan points (ωi, ψj) and emitting a laser beam from the transmitter 104 at each of the scan points.

Assuming that the optical component(s) (e.g., movable mirror 256) of a LiDAR transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" of the scan point associated with the transmitted beam 110 and the return beam 114.

In many LiDAR systems, the optical component(s) of a LiDAR transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location L0 of the spot that would have been formed absent the intervening rotation of the optical component(s) during the ranging period is referred to herein as "walk-off."

As discussed above, some LiDAR systems may use a continuous wave (CW) laser to detect the range and/or velocity of targets, rather than pulsed TOF techniques. Such systems include frequency modulated continuous wave (FMCW) coherent LiDAR systems. For example, any of the LiDAR systems 100, 202, 250, and 270 described above can be configured to operate as an FMCW coherent LiDAR system.

Figure 3:
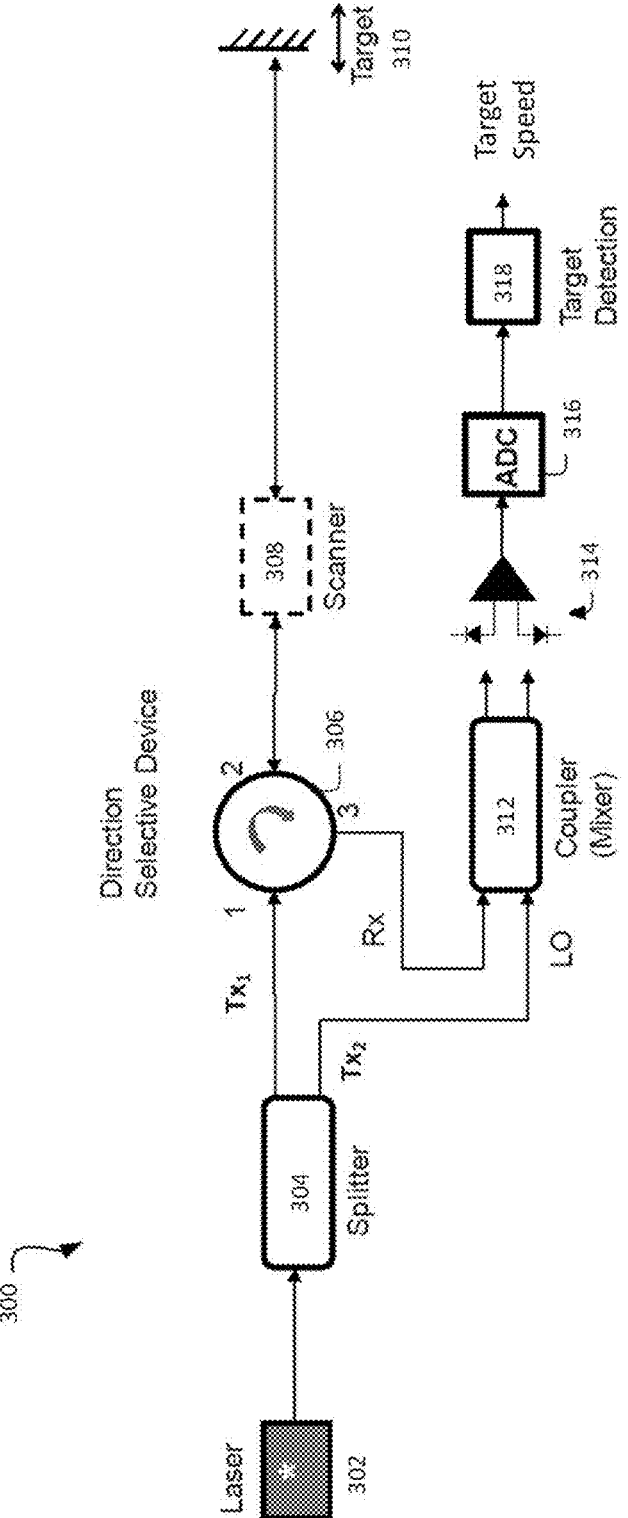
FIG. 3 is an illustration of an example frequency modulated continuous wave (FMCW) coherent LiDAR system.

FIG. 3 illustrates an exemplary FMCW coherent LiDAR system 300 configured to determine the radial velocity of a target. LiDAR system 300 includes a laser 302 configured to produce a laser signal which is provided to a splitter 304. The laser 302 may provide a laser signal having a substantially constant laser frequency.

In one example, a splitter 304 provides a first split laser signal Tx1 to a direction selective device 306, which provides (e.g., forwards) the signal Tx1 to a scanner 308. In some examples, the direction selective device 306 is a circulator. The scanner 308 uses the first laser signal Tx1 to transmit light emitted by the laser 302 and receives light reflected by the target 310 (e.g., "reflected light" or "reflections"). The reflected light signal Rx is provided (e.g., passed back) to the direction selective device 306. The second laser signal Tx2 and reflected light signal Rx are provided to a coupler (also referred to as a mixer) 312. The mixer may use the second laser signal Tx2 as a local oscillator (LO) signal and mix it with the reflected light signal Rx. The mixer 312 may be configured to mix the reflected light signal Rx with the local oscillator signal LO to generate a beat frequency (beat when detected by a differential photodetector 314. The beat frequency $f_{beat}$ from the differential photodetector 314 output is configured to produce a current based on the received light. The current may be converted to voltage by an amplifier (e.g., transimpedance amplifier (TIA)), which may be provided (e.g., fed) to an analog-to-digital converter (ADC) 316 configured to convert the analog voltage signal to digital samples for a target detection module 318. The target detection module 318 may be configured to determine (e.g., calculate) the radial velocity of the target 310 based on the digital sampled signal with beat frequency $f_{beat}$.

In one example, the target detection module 318 may identify Doppler frequency shifts using the beat frequency (beat and determine the radial velocity of the target 310 based on those shifts. For example, the velocity of the target 310 can be calculated using the following relationship:

$$f_d = \frac{2}{\lambda} v_t$$

where fd is the Doppler frequency shift, λ is the wavelength of the laser signal, and vt is the radial velocity of the target 310. In some examples, the direction of the target 310 is indicated by the sign of the Doppler frequency shift fd. For example, a positive signed Doppler frequency shift may indicate that the target 310 is traveling towards the system 300 and a negative signed Doppler frequency shift may indicate that the target 310 is traveling away from the system 300.

In one example, a Fourier Transform calculation is performed using the digital samples from the ADC 316 to recover the desired frequency content (e.g., the Doppler frequency shift) from the digital sampled signal. For example, a controller (e.g., target detection module 318) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the LiDAR system 300 is described above as being configured to determine the radial velocity of a target, it should be appreciated that the system can be configured to determine the range and/or radial velocity of a target. For example, the LIDAR system 300 can be modified to use laser chirps to detect the velocity and/or range of a target.

Figure 4:
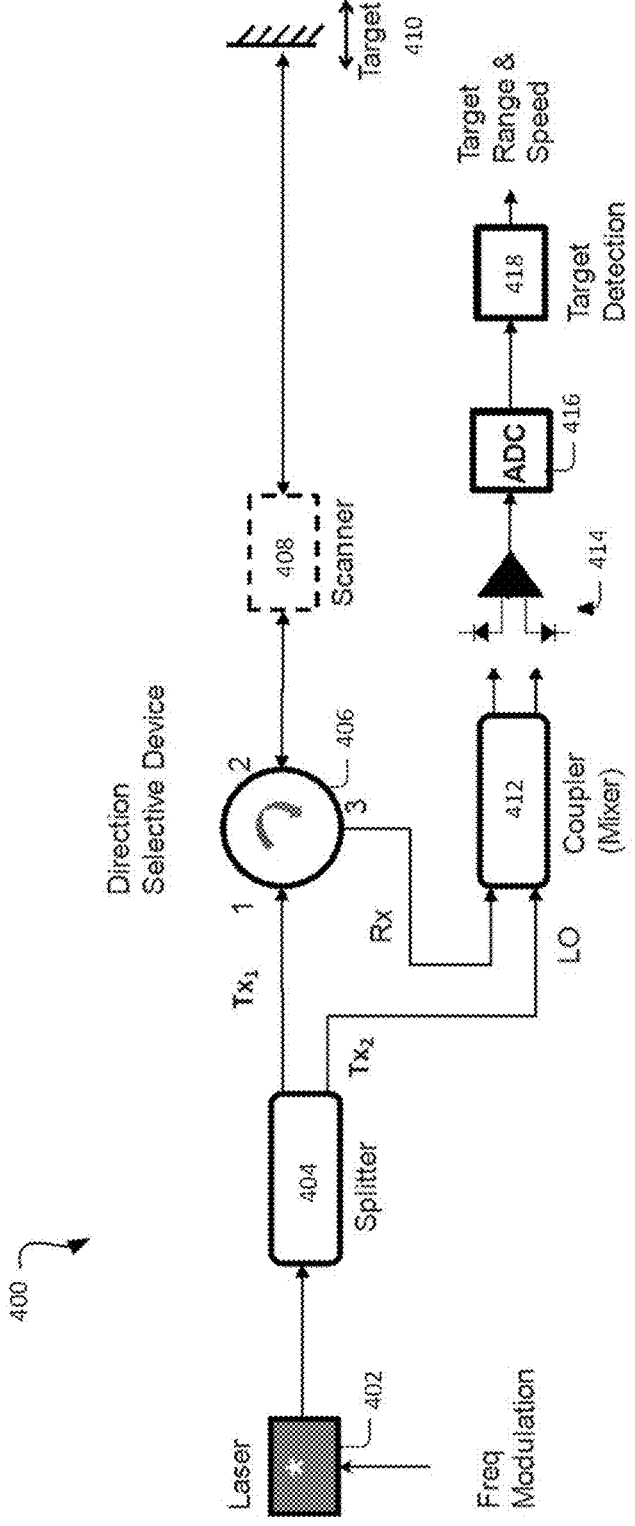
FIG. 4 is an illustration of another example FMCW coherent LiDAR system.

FIG. 4 illustrates an exemplary FMCW coherent LiDAR system 400 configured to determine the range and/or radial velocity of a target. LiDAR system 400 includes a laser 402 configured to produce a laser signal which is fed into a splitter 404. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 402; however, in other examples, an external modulator can be placed between the laser source 402 and the splitter 404.

In other examples, the laser frequency can be "chirped" by modulating the phase of the laser signal (or light) produced by the laser 402. In one example, the phase of the laser signal is modulated using an external modulator placed between the laser source 402 and the splitter 404; however, in some examples, the laser source 402 may be modulated directly by changing operating parameters (e.g., current/voltage) or include an internal modulator. Similar to frequency chirping, the phase of the laser signal can be increased ("ramped up") or decreased ("ramped down") over time.

Some examples of systems with FMCW-based LiDAR sensors have been described. However, the techniques described herein may be implemented using any suitable type of LiDAR sensors including, without limitation, any suitable type of coherent LiDAR sensors (e.g., phase-modulated coherent LiDAR sensors). With phase-modulated coherent LiDAR sensors, rather than chirping the frequency of the light produced by the laser (as described above with reference to FMCW techniques), the LiDAR system may use a phase modulator placed between the laser 402 and the splitter 404 to generate a discrete phase modulated signal, which may be used to measure range and radial velocity.

As shown, the splitter 404 provides a first split laser signal Tx1 to a direction selective device 406, which provides (e.g., forwards) the signal Tx1 to a scanner 408. The scanner 408 uses the first laser signal Tx1 to transmit light emitted by the laser 402 and receives light reflected by the target 410. The reflected light signal Rx is provided (e.g., passed back) to the direction selective device 406. The second laser signal Tx2 and reflected light signal Rx are provided to a coupler (also referred to as a mixer) 412. The mixer may use the second laser signal Tx2 as a local oscillator (LO) signal and mix it with the reflected light signal Rx. The mixer 412 may be configured to mix the reflected light signal Rx with the local oscillator signal LO to generate a beat frequency $f_{beat}$. The mixed signal with beat frequency $f_{beat}$ may be provided to a differential photodetector 414 configured to produce a current based on the received light. The current may be converted to voltage by an amplifier (e.g., a transimpedance amplifier (TIA)), which may be provided (e.g., fed) to an analog-to-digital converter (ADC) 416 configured to convert the analog voltage to digital samples for a target detection module 418. The target detection module 418 may be configured to determine (e.g., calculate) the range and/or radial velocity of the target 410 based on the digital sampled signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

Range resolution: $\Delta R = \dfrac{c}{2BW}$ (given a perfectly linear chirp), and Range: $R = \dfrac{f_{beat} c T_{ChirpRamp}}{2BW}$ where c is the speed of light, BW is the bandwidth of the chirped laser signal, $f_{beat}$ is the beat frequency, and TChirpRamp is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent LiDAR systems may rely on two measurements having different slopes (e.g., negative and positive slopes) to remove this ambiguity. The two measurements having different slopes may also be used to determine range and velocity measurements simultaneously.

Figures 5A, 5B:
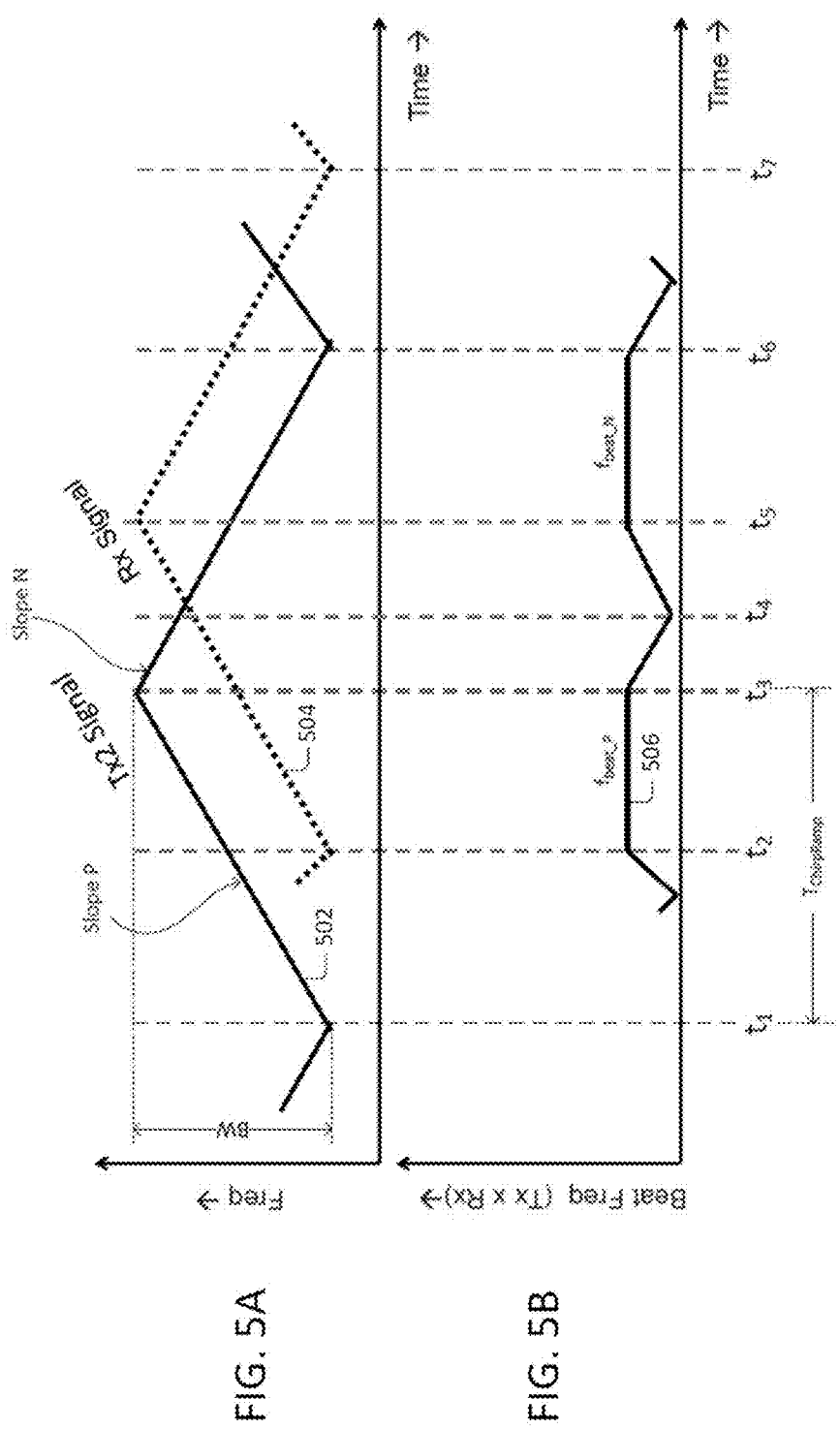
FIG. 5A is a plot of a frequency chirp as a function of time in a transmitted laser signal and reflected signal.
FIG. 5B is a plot illustrating a beat frequency of a mixed signal.

FIG. 5A is a plot of ideal (or desired) frequency chirp as a function of time in the transmitted laser signal Tx (e.g., signal Tx2), depicted in solid line 502, and reflected light signal Rx, depicted in dotted line 504. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

FIG. 5B is a plot illustrating the corresponding ideal beat frequency $f_{beat}$ 506 of the mixed signal Tx2×Rx. Note that the beat frequency $f_{beat}$ 506 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 5A-5B, when the positive and negative ramp pair is used to measure range and velocity simultaneously, the following relationships are utilized:

Range: $R = \dfrac{c T_{ChirpRamp} \dfrac{(f_{beat\_P} + f_{beat\_N})}{2}}{2BW}$, and Velocity: $V = \dfrac{\lambda \dfrac{(f_{beat\_P} - f_{beat\_N})}{2}}{2}$ where $f_{beat\_P}$ and $f_{beat\_N}$ are beat frequencies generated during positive (P) and negative (N) slopes of the chirp 502 respectively and $\lambda$ is the wavelength of the laser signal.

In one example, the scanner 408 of the LiDAR system 400 is used to scan the environment and generate a target point cloud from the acquired scan data. In some examples, the LiDAR system 400 can use processing methods that include performing one or more Fourier Transform calculations, such as a Fast Fourier Transform (FFT) or a Discrete Fourier Transform (DFT), to generate the target point cloud from the acquired scan data. Being that the system 400 is capable of measuring range, each point in the point cloud may have a three-dimensional location (e.g., x, y, and z) in addition to radial velocity. In some examples, the x-y location of each target point corresponds to a radial position of the target point relative to the scanner 408. Likewise, the z location of each target point corresponds to the distance between the target point and the scanner 408 (e.g., the range). In one example, each target point corresponds to one frequency chirp 502 in the laser signal. For example, the samples collected by the system 400 during the chirp 502 (e.g., t1 to t6) can be processed to generate one point in the point cloud.

Some Embodiments of LiDAR-Based, Immersive 3D Reality Capture Systems

Figure 6:
FIG. 6 is an illustration of an example of an immersive rendering of a 3D environment.

Described herein are some embodiments of a reality capture system ("scanner" or "sensor") with coaxial color and infrared LiDAR channels. The reality capture scanner may scan a suitable environment with sufficient speed, resolution, and range to support immersive, photorealistic 3D rendering of live action scenes. Examples of suitable environments may include professional sporting events, concerts, theatres, office spaces, flight simulators, and other environments of smaller, comparable or even greater scale. In some embodiments, the scan data provided by the reality capture scanner may be sufficient to support immersive augmented reality applications (e.g., enabling a viewer to watch a football game from a virtual vantage point within the stadium, as illustrated in FIG. 6). The reality capture system may include any suitable number of scanning devices arranged in any suitable locations.

Figure 7:
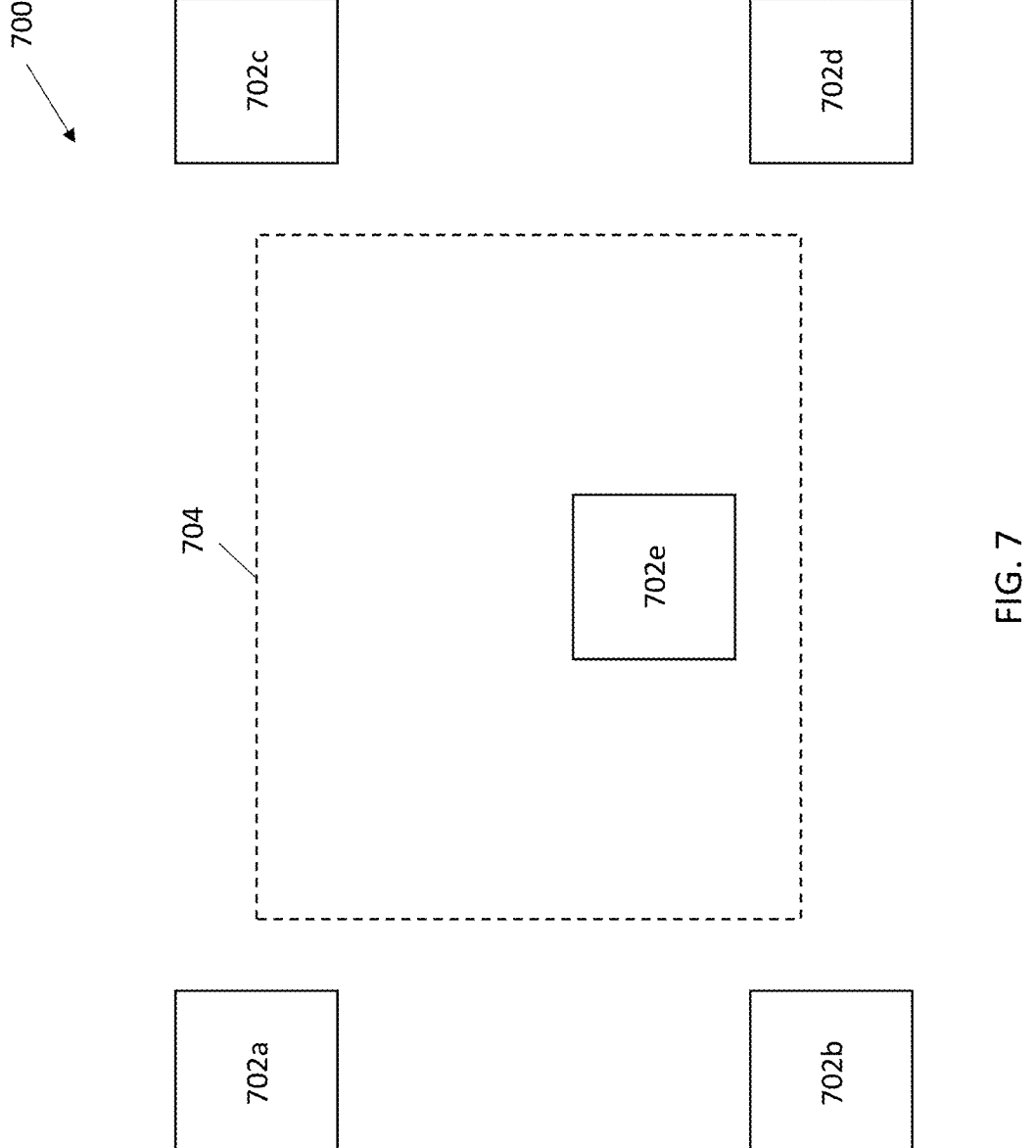
FIG. 7 is an illustration of a reality capture system 700, according to some embodiments.

FIG. 7 illustrates a reality capture system 700 including a plurality of scanning devices 702. In one example, each scanning device 702 corresponds to one or more of the LiDAR systems 100, 202, 250, 270, 300, and 400 described herein. In some examples, each scanning device 702 can be a pulsed TOF LiDAR system or an FMCW LiDAR system. In other examples, the scanning devices 702 can be implemented using different depth measurement technologies. For example, each scanning device 702 may be an indirect TOF LiDAR system, a triangulation-based LiDAR system, or a structured light imaging system. Likewise, the scanning devices 702 can be configured to operate over various wavelength ranges, including the near-ultraviolet band (e.g., 300-400 nm), the ultraviolet (UV) band (e.g., 10-400 nm), the visible band, the infrared (IR) band (e.g., 700 nm-1 mm), the near IR band (e.g., 700-2500 nm), the mid-IR band (e.g., 2500-25000 nm), and/or the far-IR band (e.g., above 25000 nm).

As shown, at least a portion of the scanning devices 702 (e.g., devices 702a-702d) are positioned around the perimeter of an environment 704. In some examples, one or more of the scanning devices 702 (e.g., device 702e) can be positioned within the environment 704. As described above, the environment 704 may correspond to a professional sporting event, concert, theatre, office space, or any other suitable environment.

Figure 8:
FIG. 8 shows the reality capture system 700 of FIG. 7 deployed in an example environment, according to some embodiments.

In the example of FIG. 8, the reality capture system 700 uses four scanning devices (702a-702d) positioned at the corners of a football pitch to scan a professional football game. In some embodiments, three or even two properly positioned scanning devices may be sufficient to support immersive, photorealistic rendering of large-scale live action scenes. The scan data provided by the scanning devices 702 can be used to provide a presentation of the football game to one or more viewers (e.g., via a virtual reality headset, a TV, a mobile phone, etc.).

As discussed above, LiDAR systems (e.g., the scanning devices 702) can be configured to operate as pulsed TOF LiDAR systems or as FMCW LiDAR systems. Design parameters for some embodiments of a reality capture scanning device 702 configured as a pulsed TOF LiDAR system may be selected in accordance with the following parameters and constraints:

aperture $\Phi$ of the scanning device's laser (e.g., 0.037 mm);

the device's target resolution $\sigma$ (e.g., 0.01 m) at a suitable range 'd' (e.g., 40-6050 m);

the device's target angular resolution (i.e., the maximum change in the transmission angle of successive scanning beams) $\gamma=\sigma/d$ (e.g., 0.2 mrad);

the device's transmitter lens focal length $FL=\Phi/\gamma$ (e.g., 185 mm);

F number ('Fno') of the transmitter optical sub-assembly (TROSA) (e.g., 1.5-2.5);

the device's transmitter lens aperture $Ap=FL/Fno$ (e.g., 92.5 mm);

number of scan lines ('lines') per image (e.g., 512, 1024, 2048, etc.);

frame rate of 10 Hz to 1000 Hz, preferably 30 Hz;

representative height ('H') of entities of interest (e.g., athletes, performers, etc.) in the environment (e.g., 1.6-2.4 m);

ratio 'RasterFF' of raster pitch to spot diameter of the transmitted beams (e.g., 1.35);

numbers of lines per entity of interest at range d: $LoT=(H/\sigma)/RasterFF$ (e.g., 148);

the device's channel pitch $Cpitch=\gamma*FL*RasterFF$ (e.g., 0.05 mm);

the device's vertical field of view $vFOV=\gamma*RasterFF*lines$ (e.g., 15.8 degrees);

height ('mHeight') at which the device is mounted (e.g., 3.2-4.8 m);

horizontal distance traveled by bottommost beam before it intersects the ground: $x\_distance=mHeight/vFOV$ (e.g., 14.5 m);

number of wings (e.g., stacks of channels) ('numWings') of the device (e.g., 4, 8, 12, etc.);

channels ('cpw') per wing of the device (e.g., 64, 128, 256, etc.); and channel spacing on each wing: $wingCP=Cpitch*numWings$ (e.g., 0.4 mm).

In some embodiments, the range of a reality capture device 702 having the attributes described above can detect a target having diffuse reflectivity of 10% at a range of up to 100 m.

In some embodiments, a suitable laser diode aperture (e.g., approximately 0.037 mm) may be achieved by using small laser diodes (e.g., single mode).

In some embodiments, the laser beam may be amplified with a semiconductor optical amplifier and integrated on a device that performs two or more photonic functions (e.g., a photonic integrated circuit (PIC) or integrated optical circuit).

In some embodiments, the transmitter and receiver of a LiDAR channel may be integrated on a single device (e.g., PIC or integrated optical circuit).

In some embodiments, the transmitter and receiver may be integrated on a planar wave guide.

In some embodiments, a reality capture device 702 having the attributes described above may have a device diameter of approximately 6.5 inches.

In some embodiments, a reality capture device 702 having the attributes described above may be configured as shown in FIG. 8.

In some embodiments, the spot diameter of a beam transmitted by the reality capture device 702 may be 0.01 m at a range of 50 m. In some embodiments, a single-mode laser diode may be used to achieve smaller spot diameters (e.g., 0.001 m) for the transmitted beams at a range of 50 m, which may facilitate scanning at a resolution suitable for sharp, photo-realistic rendering.

In some embodiments, visible or UV wavelength lasers may be used to produce smaller spot sizes than 0.01 m for finer resolution. For example, the use of UV wavelength lasers can provide a 3-5× reduction in spot size, corresponding to a 3-5× increase in the resolution of the reality capture device 702.

In some embodiments, a single channel may be split into distinct scan lines, and the data interleaved to produce a higher resolution image. For example, the single channel may be split using multiband or multiplexing techniques. In one example, an optical mechanism (e.g., mirror, prism, etc.) can be used to shift the locations scanned by LiDAR channels over a sequence of sweeps. For example, an optical mechanism can be used to shift the scan lines scanned by 1024 channels over a sequence of 4 sweeps. The measurements corresponding to each sweep can then be interlaced to generate a frame of 4096 lines, corresponding to 4096 virtual channels.

In some examples, the design parameters for a reality capture scanning device 702 configured as an FMCW LiDAR system may be substantially similar to those described above for a pulsed LIDAR system. Referring to FIG. 5A, design parameters for some embodiments of a reality capture scanning device 702 incorporating coherent LiDAR devices (e.g., FMCW LiDAR devices) may be selected in accordance with the following parameters and constraints:

frequency chirp up/down time TChirpRamp (e.g., 1-100 μs);
frequency chirp bandwidth (e.g., 0.5-3 GHz);
center wavelength (e.g., 1280-1390 nm, 1900-1600 nm, etc.); and
aperture diameter (e.g., 5-20 mm).

Given the continuous wave nature of operation, FMCW LiDAR systems may be used to implement virtual LiDAR channels, according to come embodiments. In this context, the phrase "virtual channel" refers to any LiDAR channel that is synthesized from one or more physical LIDAR transmitters and/or receivers. For example, a LiDAR component included in an FMCW LiDAR system can be configured with a multiple-input, multiple-output (MIMO) array. The MIMO array may include 4 transmit elements and 16 receive elements that correspond to 64 synthesized virtual channels. In other examples, a single channel may be configured to produce several distinct wavelengths of light which can then be optically separated to function as distinct channels. In certain examples, the virtual channels may be software-defined channels implemented by at least one controller (e.g., the control & data acquisition module 108 of FIG. 1). Due to the use of virtual channels, the size of the scanning device 702 may be reduced when configured as an FMCW LiDAR system. For example, to achieve 1024 scan lines per image, the FMCW LiDAR system may include 16 LiDAR components configured to provide 64 virtual channels each. As such, the size of each wing (e.g., the number of physical channels in a wing) and/or the number of physical wings included in the LiDAR scanning device 702 can be reduced. Alternatively, additional LiDAR components may be included to increase the number of scan lines per image (i.e., increase the device's target resolution) while maintaining the size of the scanning device 702.

In some embodiments, to allow the color to be applied to the obtained point data, each reality capture scanning device 702 may be further equipped with a digital video camera to allow the LIDAR data and the color images to be obtained along the same optical axis, thereby facilitating the subsequent integration of the LIDAR data (e.g., range information) with the color images. The data from the digital video camera may be overlaid with the point cloud generated from the LiDAR data, so as to colorize and/or texturize the point cloud. To allow the LIDAR sensor and digital video camera to receive optical signals along the same axis, the digital video camera may be mounted on a same gimbal with a scanner of the LiDAR sensor, so that the digital camera may rotate simultaneously with the scanner when the scanner is scanning the surrounding environment. This may prevent the introduction of parallax between the point cloud data and the color images due to the apparent displacement of objects in the scene that would otherwise be caused by difference between the points of view of the LIDAR sensor and the video camera. In one example, the digital camera may be mounted on top of the scanner of the LiDAR channel on the same gimbal.

Figure 9A:
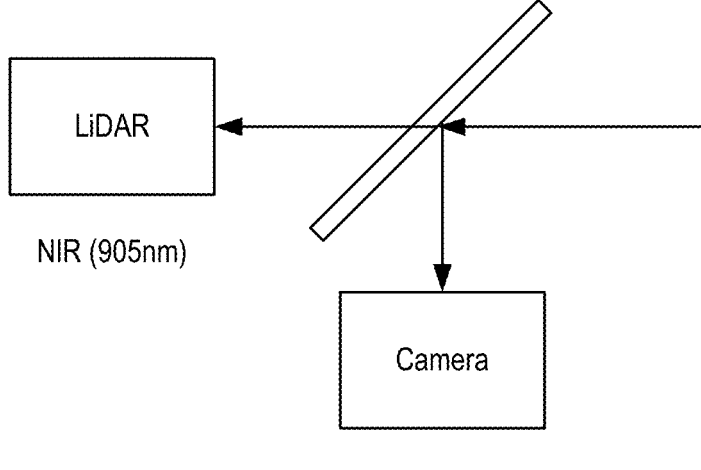
FIG. 9A shows an example beam splitter that separates optical signals for LiDAR sensor and imaging sensor, according to some embodiments.

In some embodiments, reality capture scanning device 702 may further include a beam splitter configured to separate optical signals returning from the environment for imaging sensor and LiDAR sensor, as shown in FIG. 9A. These two types of signals may have different wavelengths. For example, the optical signals for the imaging sensor may have a wavelength in the visible range (e.g., 400-700 nm), while the optical signals for the LiDAR sensor may have a wavelength in the near-infrared (NIR) range (e.g., approximately 905 nm). The beam spitter may be configured to separate these two type of optical signals and direct them towards the imaging sensor and LiDAR sensor respectively.

In some embodiments, to allow the color point cloud to be integrated into a virtual reality application, software may be used to extract the point cloud data in an x-y-x-r-b-g format for the VR environment. In the x-y-z-r-b-g format, each pixel or point is assigned 3 values representing its position (e.g., x, y, z coordinates in a 3-D cartesian coordinate system) in a 3-D environment and 3 values representing its color (e.g., r-b-g for red, blue, and green components). Other formats are possible. In some embodiments, to improve the quality of the rendered images, the reflectance values for each point also may be included during the data extraction. Here, the reflectance values may be obtained based on the images taken by the digital camera and/or based on the LIDAR data. In some embodiments, due to the limitation of the data processing, the reflectance values are ignored.

In some embodiments, before the colorization of the point cloud data, the data from different cameras and LiDAR components first may be calibrated for better alignment of data from different reality capture scanning devices 702. This may include spatial calibration and temporal calibration for both imaging data and pointing cloud data, as described in the following.

Calibration

For the reality capture system 700, spatial calibration and temporal calibration of the reality capture devices 702 are both important determinants of the system performance. For spatial calibration, identifiable features within the environment may be used to detect possible changes in position and/or orientation of the LiDAR sensors of the reality capture devices 702.

During operation of a LIDAR sensor (e.g., LIDAR system 100), the sensor's position and/or orientation relative to its operating environment may shift. The sensor's position and/or orientation may shift due to external factors, including bumps, shocks, and vibrations, as well as due to movement of or deformations to the reality capture device 702 that includes the LiDAR sensor. Generally, such changes to the sensor's position or orientation introduce distortions into the point cloud generated by the LiDAR sensor until the sensor undergoes recalibration of extrinsic parameters that were initially calibrated based on the LiDAR sensor's spatial relationship to its environment. Accordingly, there is a need for techniques for detecting miscalibration of a LiDAR device's extrinsic parameters. In addition, there is a need for techniques for remediating such miscalibration.

Figure 9B:
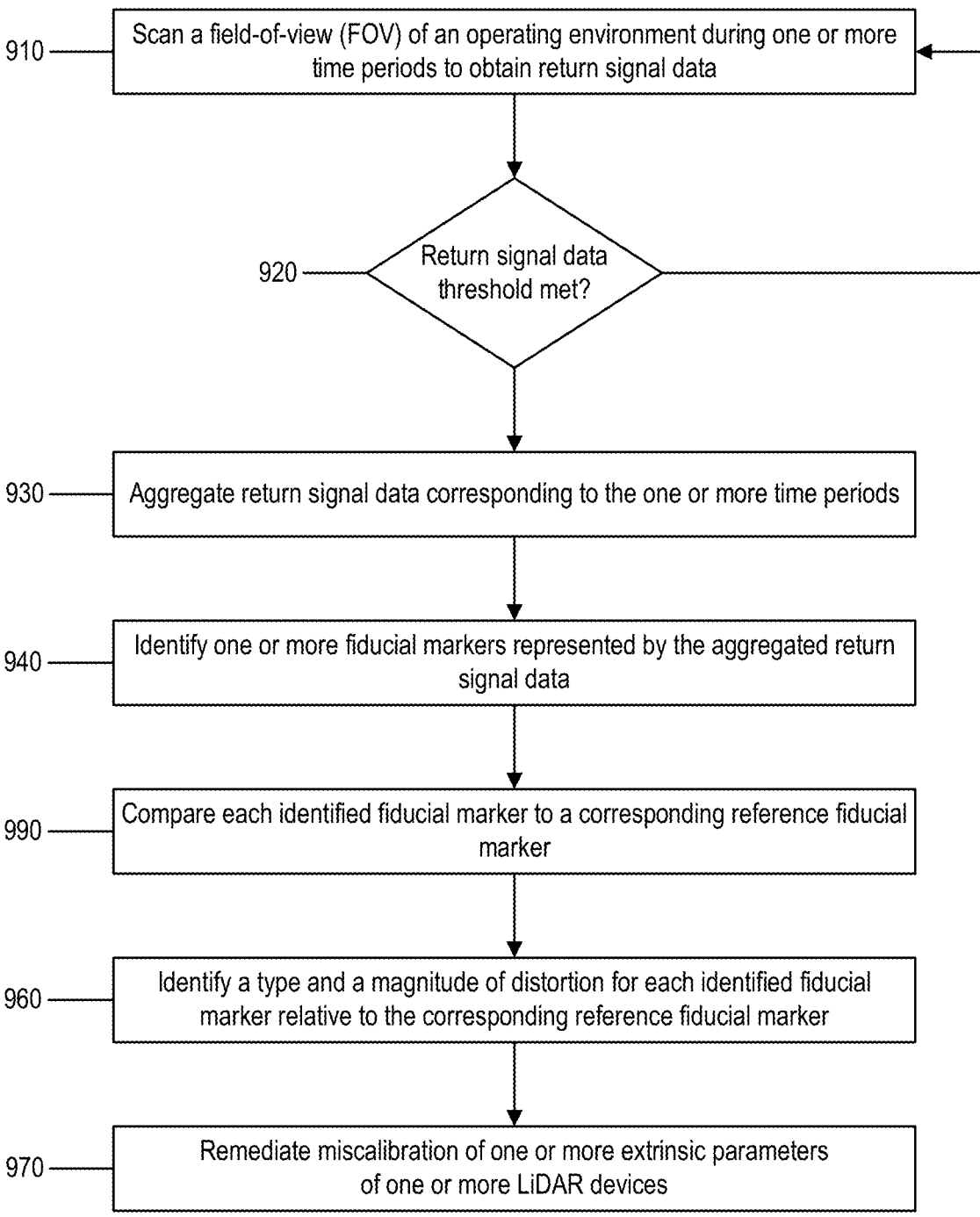
FIG. 9B shows a flow chart of a method for detecting miscalibration of LiDAR device parameters, in accordance with some embodiments.
Figure 9C:
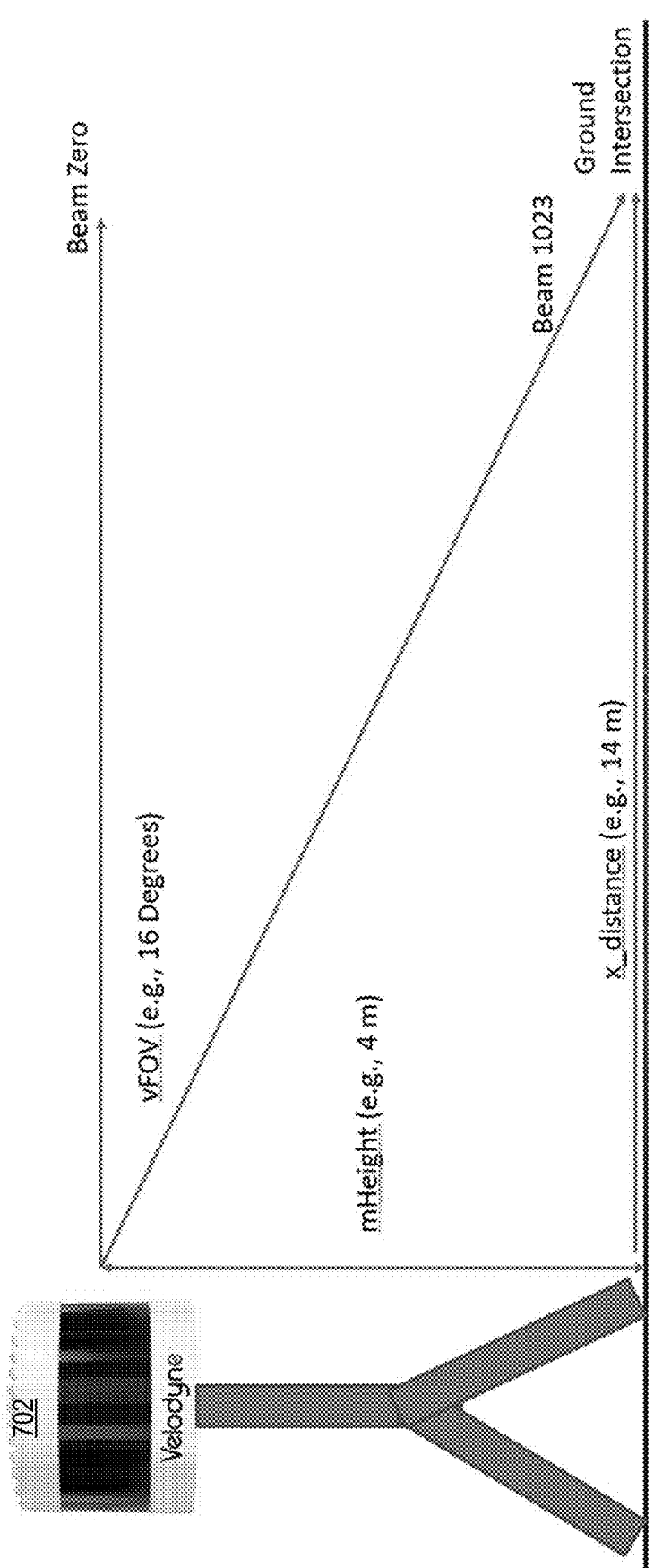
FIG. 9C shows a configuration of a reality capture device 702, according to some embodiments.

Referring to FIG. 9B, a flow chart of a method 900 for dynamic detection of extrinsic parameter miscalibration is shown, in accordance with some embodiments. For simplicity, the following paragraphs describe the method 900 with reference to a single LiDAR device/channel 102 of the LiDAR system 100. However, one of ordinary skill in the art will appreciate that the steps 910-960 of the method 900 may be performed for a combination of two or more LiDAR devices 102 of the LiDAR system 100 if two or more LiDAR devices 102 scan the FOV to generate point measurements (e.g., to detect fiducial markers) of the surrounding environment. The method 900 may be performed during operation of the LiDAR system 100 while the LiDAR system 100 is in motion (e.g., mounted to a travelling apparatus 302), such that fiducial markers may be identified during normal operation of each LiDAR device 102 as the LiDAR system scans the FOV. As an example, a LiDAR system 100 integrated with a vehicle may perform the steps of the method 900 during normal operation of the vehicle (e.g., to travel to a destination).

In some embodiments, the method 900 involves (1) scanning, via one or more LiDAR devices 102, a field-of-view (FOV) in the operating environment 300 during one or more time periods, (2) aggregating return signal data corresponding to the one or more time periods (e.g., such that the aggregated return signal data exceeds a return signal data threshold), (3) identifying one or more fiducial markers in the aggregated return signal data, (4) comparing the identified fiducial markers to corresponding reference fiducial markers, and (5) identifying distortion (if present) for the identified fiducial markers relative to the corresponding reference fiducial markers. In some embodiments, the method 900 further involves characterizing the identified distortion in a fiducial marker (e.g., determining a type and magnitude of the distortion) and/or remediating the identified miscalibration.

Referring to FIG. 9B, at step 910 of the method 900, one or more LiDAR devices 102 of a LIDAR sensor may scan a FOV of an operating environment during one or more time periods. To scan the FOV of the operating environment, the LIDAR sensor may cause one or more transmitters 104 of one or more LIDAR devices 102 to generate and emit optical signals (110, 306), and receivers 106 of each of the LiDAR devices 102 may receive return signals 114 reflecting from objects 112 in the surrounding environment. The LIDAR sensor may scan the FOV (e.g., to the full extent of the FOV in both the horizontal and vertical directions) to generate one or more 3D point cloud representations of the operating environment. The one or more 3D point cloud representations may include representations of one or more identifiable features (e.g., fiducial markers).

In some embodiments, the fiducial markers include static objects or structures within the environment (e.g., a target area such as a football field). For example, these static objects and structures may have a predefined shape and size that do not change from one frame to another, and thus may be used for spatial calibration purposes. In some embodiments, the reality capture system 700 may also include one or more stored representations of same or similar objects and structures that can be used as reference objects or structures, also called reference fiducial markers during the spatial calibration process. These reference fiducial markers may have certain attributes that allow a comparison to be completed during the calibration process. These attributes may include dimensions (e.g., width, height), reflectance values, and the like that have predefined values that do not change under different circumstances. These reference dimensions and values may be used to compare against the identified objects and structures from the point clouds, so as to determine whether there is any spatial change (position and/or orientation change) of the LIDAR sensors, resulting in a mis-calibration of the LIDAR sensors.

At step 920, the LIDAR sensor may determine whether a return signal data threshold for detecting miscalibration of extrinsic LIDAR parameters has been met (or exceeded). In some cases, return signal data may correspond to return signal data obtained during time periods in which the LIDAR sensor is stationary and an identified fiducial marker is in motion. In some cases, at least 50 samples of return signal data may be preferred, where the samples are aggregated and used for detecting miscalibration of extrinsic LIDAR parameters. If the LIDAR sensor determines the return signal data threshold is met or exceeded, the LIDAR sensor may proceed to step 930. If the LIDAR sensor determines the return signal data threshold is not met, the LIDAR sensor may revert to step 910 as described herein.

At step 930, the LIDAR sensor 100 may aggregate return signal data corresponding to the one or more time periods. The return signal data may include return signal intensity, location, and temporal data, which may be used to generate 3D (or a combination of 2D) point cloud measurements of one or more fields of view of the operating environment for the LIDAR sensor. In some cases, the point cloud measurements may include point cloud representations of standardized and/or known fiducial markers, which may be used to detect changes in a position and/or an orientation of a particular LIDAR device 102 included in the LIDAR sensor. In some embodiments, the aggregation of return signal data into one or more point clouds may occur during the scanning of the FOV, such that the LIDAR sensor proceeds directly from step 920 to step 940 when the return signal data threshold is met.

At step 940, the LIDAR sensor may identify one or more fiducial markers represented by the point cloud measurements of the return signal data. Such fiducial markers may be identified, for example, by applying object detection or environment perception techniques to the return signal data (e.g., including those described below in the section titled "LIDAR-Based Object Detection"). As described herein, fiducial markers may include standardized and/or known fiducial markers, where the LIDAR system includes stored reference representations of the standardized and/or known fiducial markers. In some cases, the LIDAR sensor may identify common fiducial markers between different point cloud measurements of the operating environment, which may each be considered the same fiducial marker for comparison purposes as described below.

At step 950, the LIDAR sensor may compare one or more (e.g., all) identified fiducial markers to corresponding reference fiducial markers. The LIDAR sensor may compare a shape and/or size of each identified fiducial marker to a shape and/or size of the corresponding reference fiducial marker. The reference fiducial markers may have a particular shape and/or size such that changes to a position and/or an orientation of a particular LIDAR device 102 may be identified if there is a difference between the shape and/or size of an identified fiducial marker and the shape and/or size of a corresponding reference fiducial marker. In some cases, a plurality of fiducial markers each may be compared to the same reference fiducial markers. For example, for return signal data that include point cloud representations of a plurality of field markings, the LIDAR sensor may compare each identified field marking to a reference representation of the field marking stored by the LIDAR sensor.

At step 960, the LIDAR sensor may identify a type and a magnitude of distortion of an identified fiducial marker relative to a corresponding reference fiducial marker. Distortion of a particular identified fiducial marker may be indicated by blurring of the identified fiducial marker relative to a reference fiducial marker. A type of distortion may correspond to a change in one or more particular degrees of freedom of a position and/or an orientation of a LiDAR device 102. In some cases, the magnitude of distortion between an identified fiducial marker and a corresponding reference fiducial marker may correspond to a magnitude of a change in position and/or orientation of a particular LiDAR device 102. The magnitude of distortion may be determined based on differences between the visual attributes (e.g., size, shape, etc.) of the identified fiducial markers and the reference fiducial markers. The magnitude of distortion may be represented by a difference in the size (e.g., length, width, height, etc.) and/or shape of the identified fiducial marker and the corresponding reference fiducial marker. In other cases, the magnitude of distortion between an identified fiducial marker and a corresponding reference fiducial marker may be represented by a ratio of the size (e.g., length, width, height, etc.) and/or shape of the identified fiducial marker and the corresponding reference fiducial marker.

In some embodiments, the LIDAR sensor detects miscalibration of one or more extrinsic parameters if the magnitude of distortion of any identified fiducial marker exceeds a distortion threshold. On the other hand, if the magnitude of distortion of each identified fiducial marker is below the distortion threshold, the distortions may be disregarded or treated as negligible, such that miscalibration of extrinsic parameters is not detected.

For identified fiducial markers that are each compared to a same reference fiducial marker, the LIDAR sensor may determine an average type and average magnitude of distortion (e.g., blur) for that particular identified fiducial marker. As an example, for an identified fiducial marker corresponding to a field marking, the LIDAR sensor may identify the identified lane marking as blurred relative to a stored representation of a field marking (e.g., reference fiducial marker), such that the identified field marking is wider (e.g., due to blurring) than the stored representation of the field marking. The difference in width (or a ratio of the widths) between the identified field marking and the stored representation of the field marking may be determined to be the magnitude of distortion for the identified fiducial marker.

At step 970, the LIDAR sensor may remediate the detected miscalibration of one or extrinsic parameters of one or more LIDAR devices 102. The LIDAR sensor may input the identified type(s) and magnitude(s) of distortion (e.g., non-negligible distortion) to a compensation algorithm to determine one or remedial actions to initiate. As described herein, the extrinsic parameters may be indicative of a particular LiDAR device's position and/or orientation relative to the x-, y-, and z-axes. In some cases, the LIDAR sensor may determine a magnitude of an adjustment to one or more extrinsic parameters based on the identified magnitude(s) of distortion for a combination of the identified fiducial markers. In some cases, the LIDAR sensor may determine which of the extrinsic parameters to adjust based on the type(s) of distortion for a combination of the identified fiducial markers. For example, for a plurality of identified field markings having an average type and magnitude of distortion, the LIDAR sensor may use the average type and magnitude of distortion determined from the plurality of identified field markings to determine which of the one or more extrinsic parameters to adjust and the corresponding magnitude(s) for the adjustment.

The remedial action(s) may account (e.g., compensate) for the changed position and/or orientation of at least one LIDAR device 102, such that the quality of the images rendered based on environmental point cloud data may be improved relative to image quality without the remedial action(s). In some cases, the LIDAR sensor may generate an alert as described herein based on type(s) and magnitude(s) of distortion for identified fiducial markers, where the alert may be output to an operator (e.g., of the reality capture system 700) and/or to an external computing system (e.g., system 1000) coupled to the LIDAR sensor. Other types of remedial actions may be initiated.

With respect to temporal calibration, the objective of the process is to synchronize the timing from different cameras or LiDAR components. It also means that for a specific object in motion, when different LiDAR components are scanning the same object, due to the time required for each scanning cycle, the difference in detecting motions of the same object needs to be calibrated or compensated. This is especially important for the application of the reality capture scanning devices 702 in virtual reality applications due to the inclusion of certain dynamics in a target scene.

For example, imagine that there are two reality capture scanning devices 702 installed on two corners of a field. If the LiDAR components in these scanning devices 702 both scan clockwise, they might meet in the middle during the scanning process. However, since the two LiDAR components are not located in the same location, the LiDAR sampling of a player in the movement may show a clear difference between the two LiDAR components. Therefore, if all the devices scan in the same rotational direction, it can wind up in situations where a particular region of the scene is being simultaneously scanned by 4 sensors at one time, and then not scanned by any sensors for a (relatively) long time, and then simultaneously scanned by 4 sensors again. That would lead to some weird issues with some frames (or portions of the frames) being lagged. Through the spatial calibration (including adjusting the scanning directions of different LiDAR components), all regions of the environment can be ensured to scan with approximately the same frequency and the same interval between scans. That is, by flowing a timing protocol, the timing difference between two LiDAR systems may be computed and compensated. This then allows the motions series from the two LiDAR components to be aligned following the same timing table.

In some embodiments, a precision time protocol (PTP) or generalized precision time protocol (gPTP) may be used during the temporal calibration process to allow a same timing table to be used across multiple reality capture scanning devices 702. PTP is a protocol for distributing time across a packet network. It works by sending a message from a master clock to a slave clock, telling the slave clock what time it is at the master. However, the main issue is working out the delay of that message, and much of the PTP protocol is dedicated to solving that problem. PTP works by using a two-way exchange of timing messages, known as "event messages". It is easy to calculate a "round trip delay" from this, and the protocol then estimates the one-way message delay by simply halving the round-trip delay. gPTP may work similarly to the PTP timing protocols, but may be more robust against delay variations due to certain additional features included in the timing protocol.

In applications, to allow the reality capture scanning devices 702 to be synchronized from different stations or locations following the PTP or gPTP timing protocol, a listening station may be further included in the reality capture system 700. The listening station may listen to each LiDAR component included in the system, and determine the timing of the LiDAR component at any time point of the scanning process. Since different reality capture scanning devices 702 use the same listening station for timing, the timing tables among different reality capture scanning devices 702 can be synchronized (e.g., following a same timing table). In some embodiments, instead of using a specialized listening station, the LiDAR components in the disclosed reality capture system 700 may listen to one another (e.g., the first one listens to the second one, the second one to the third one, . . . the last one to the first one), which also allow a temporal calibration of different reality capture scanning devices 702 included in the system 700.

In some embodiments, the listening station may be not just used for timing and synchronization, but also used to check the scanning activities of each LiDAR scanner. For example, the listening station may check the scanning angle and thus directed point in the field at any time point of the scanning process for a LiDAR scanner. In this way, the listening station may identify the directed points for all LiDAR components included in the reality capture scanning devices 702. By continuously tracking each directed point between different LiDAR components, a temporal calibration of different LiDAR components may be also achieved. In some embodiments, without the inclusion of a listening station, LiDAR components may also listen to one another, to identify the scanning process of a target LiDAR component at each time point. This information may be also used for temporal calibration between different LiDAR components in the system.

In some embodiments, other temporal calibration processes may be also possible and are contemplated by the present disclosure. In some embodiments, once the spatial and temporal calibrations are completed, the data (including the imaging data and/or point cloud data) from different reality capture scanning devices 702 may be integrated or fused, to reconstruct a full scene model that can be integrated into a virtual reality environment.

LIDAR-Based Object Detection

In some embodiments, a LIDAR sensor may aggregate environmental data (e.g., range and/or reflectance data) including point cloud measurements. Within such point cloud measurements, objects and/or surfaces may be represented by one or more point measurements, such that the objects and/or surfaces may be identified (e.g., visually identified) using LIDAR-based object detection techniques. To identify such objects and/or surfaces, point cloud measurements may be supplied to "object detection" and/or "environmental perception" systems, which may be configured to analyze the point cloud measurements to identify one or more specified objects and/or surfaces, including players, balls, field markings, goals, goal posts, etc. In some cases, the object detection and/or environmental perception systems may be configured to identify fiducial markers as described herein, which may be used as a part of a process for detecting mis-calibrated extrinsic LIDAR parameters. Some non-limiting examples of object detection and/or environmental perception systems that may be used as a part of a process for detection of mis-calibrated extrinsic LIDAR parameters include those described by Rastiveis et al. in "Automated extraction of lane markings from mobile LiDAR point clouds based on fuzzy inference" (ISPRS Journal of Photogrammetry and Remote Sensing 160 (2020), pp. 149-166) and by H. Zhu et al. in "Overview of Environment Perception for Intelligent Vehicles" (IEEE Transactions on Intelligent Transportation Systems (2017), pp. 1-18).

Alignment and Fusion

In some embodiments, based on certain features (e.g., the identifiable features as described above), the images and point clouds that reflect different viewing angles of the same objects and scenes may be overlaid or aligned by positioning the same identifiable features in the same positions among different images and point clouds. That is, these identifiable features may be used as reference objects or items for alignment and fusion purposes during the fusion process (e.g., 3D reconstruction) of different images and point clouds.

For example, if multiple reality capture scanning devices 702 are positioned at different locations within a football stadium, field lines, yard labels (e.g., 10, 20, 30, etc.), goal posts, logos, or other identifiable features included in the stadium may be used for alignment and fusion purposes. For example, if a logo is present in the middle of the field, the logo may be used for alignment and fusion purposes. This may include aligning the logo from different images or point clouds to fuse the images or point clouds from different reality capture scanning devices.

In some embodiments, the specific alignment and fusion process includes a comparison of one specific identifiable feature or object (e.g., logo) among different images or point clouds. This may include a comparison of a shape and/or size of the identifiable feature or object from different images or point clouds. Since these identifiable features and objects have unique shapes and/or sizes in these images or point clouds, and since each reality capture scanning device 702 covers a full range (e.g., a whole field in the stadium) and thus may have a same set of identifiable features or objects, the comparison can be easily achieved. In some embodiments, if no unique feature can be easily identified from the images or point clouds, multiple different identifiable features may be combined during the alignment and/or fusion process. For example, if only lines are present in the field among the images and point clouds, some or all lines in the field may be used during the alignment and/or fusion process, to allow a better and more accurate alignment and fusion to be achieved.

In some embodiments, the multiple reality capture scanning devices 702 may be positioned at the fixed locations around a field. In addition, the scanners included in these devices may scan along a predefined pattern, and the image sensors may capture images at a predefined angle. Accordingly, based on these location information and imaging angles, the alignment and fusion of images and point clouds may be also achieved. For example, each pixel and cloud point in the images or point clouds may correspond to one specific site point in the aforementioned field, which may correspond to a geospatial point in a positioning system (e.g., a local or global positioning system). The position of each reality capture scanning device 702 in the positioning system may be also predefined. By integrating the pixels or cloud points from different images or point clouds into the same position systems, the spatial information from different images or point clouds may be also aligned and/or fused.

In some embodiments, the alignment and fusion of different images and point clouds may be achieved through deep learning or other different machine learning approaches. For example, deep convolutional neural networks may be used to identify extrinsic parameters between cameras and LiDAR components. This may include an initial estimate and continuous correction of extrinsic parameters, allowing the alignments of these parameters in different images or point clouds. The machine learning-based approaches do not require specific landmarks or scenes to be present in the images or point clouds, which may facilitate the application of the multiple reality capture scanning devices 702 under certain specific scenarios, e.g., a crowd light club full of people in motions. In some embodiments, other different alignment and fusion techniques may be used for the fusion of images and point clouds from different cameras and LiDAR components. Additionally or alternatively, more than one alignment and/or fusion method may be used during the alignment and/or fusion process, especially at the initial stage of the deployment of the reality capture scanning devices 702 to a specific scene.

Figure 9D:
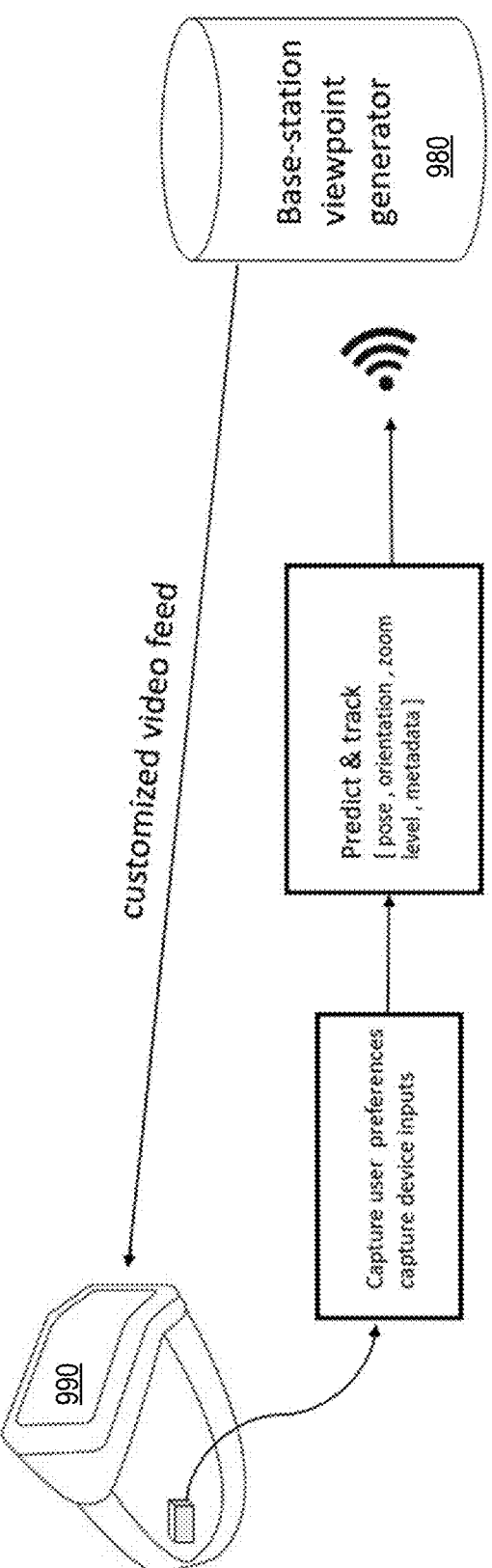
FIG. 9D shows a configuration of a base station viewpoint generator for a reality capture system, according to some embodiments.

Referring to FIG. 9D, in some embodiments, the reality capture system 700 may additionally include a base station viewpoint generator 980 coupled to the reality capture scanning devices 702. The base station viewpoint generator may be configured to receive data, including imaging data and cloud point data, from different imaging sensors and LiDAR sensors. The base station viewpoint generator may further generate customized video feed based on the received data. For example, the base station viewpoint generator may generate point clouds from LiDAR sensor data and images from imaging data, and further align and/or fuse the point clouds and images generated therein to generate 3D images and point clouds. In some embodiments, the videos may be also similarly generated based on the data continuously fed into the base station viewpoint generator. The generated videos may include imaging videos and point cloud videos. In some embodiments, the imaging videos and point cloud videos may be further fused to generate a fused video including the information from the imaging data and point cloud data. In one example, the fused video may be a point cloud video that incorporates color and reflectance for objects and other structures included in the video.

In some embodiments, the base station viewpoint generator may further transmit (wirelessly or wired) the generated different videos to a virtual reality device 990 (e.g., head-mounted VR display), to allow the videos to be integrated into the virtual reality environment, as further described in detail below.

Data Transmission and Processing

In some embodiments, due to multiple LiDAR components and cameras included in the system 700, there is a large amount of data involved in the data processing when there are multiple reality capture scanning devices 702. This includes preprocessing of individual data from different digital cameras and LiDAR components, as well as post-processing of preprocessed data in the fusion and further integrated and/or presentation to a virtual reality environment. Accordingly, certain techniques may be implemented to minimize the data processing and/or transmission for the disclosed reality capture system 700.

In one approach, data reduction may be achieved by using models (e.g., computer-generated imagery (CGI)) for certain objects to replace actual objects during data processing and/or transmission. For example, certain computer-generated CGIs may be used to replace characters, scenes, and certain other special effects. For example, for yard labels (e.g., 10, 20, 30, etc.) in a field, once they are identified, the related cloud points/pixels or other imaging data may be not required for later processing (e.g., fusion, image reconstruction and the like) and/or transmission. When the eventual image or video is to be integrated into the virtual reality environment or presented to the audience, the computer-generated numbers may be directly placed into the corresponding positions, which then greatly saves the computation resources and/or bandwidths for data transmission.

In another approach, certain avatars can be used to replace players in a field, which also saves data processing and/or transmission for the disclosed reality capture system 700. These avatars may act similarly in playing different roles in sports, as can be seen in many video games. For example, if a player is detected running in a direction, the animated avatar may mimic the running motion of the actual player during the presentation of the game to the audience.

In yet another approach, background subtraction may be also used to avoid processing certain data that is trivial to what is actually happening in a scene. This may include identifying static objects (e.g., certain stadium structures) that are not important for activities happening in a field, or identifying certain moving objects but they are trivial to what is happening in the field either. For example, for the audience on a tennis court of a tennis game, a same audience image or video clip may be used without changing throughout the game, since what is really interesting to people is what is happening on the court. Similarly, data processing and/or transmission for the sky or any other portion that is not interesting can be minimized by background subtraction.

According to a further approach, only the differential data are transmitted or processed. For example, for the scoring board on a tennis court, only the changed scores are transmitted throughout the game, while the data for the remaining part of the scoreboard is not transmitted. Additionally or alternatively, the frequency of transmitting static objects may be reduced. For example, data for the judge or line referees may have a much lower data transmission frequency when compared to the tennis players on the court.

In some embodiments, limiting certain functions of the disclosed reality capture system 700 may also reduce data processing and transmission without a sacrifice of user experience with the reality capture system 700. For example, during real applications, LiDAR components and LiDAR data may be activated first and used to locate a key player, and then the cameras may use the location information from the LiDAR to zoom in on the identified key player. This can prevent the cameras from zooming in on every player during a game, saving the data processing and transmission.

In some embodiments, reduced packet format may be also used to minimize data transmission. This may include using compressed video or image data for transmission through data encoding and decoding processes, but not using raw imaging or point cloud data for transmission.

In some embodiments, the data may be dynamically selected for processing, transmission, and/or presentation. For example, in a stadium, its 3D volume may be broken into small cubes or cells. For a specific user, it may only view a certain part of the stadium from his angle of view. Accordingly, only certain cubes or cells may be associated with that specific user. Therefore, when transmitting data to that specific user (e.g., to his/her VR device), only data for the associated cubes or cells will be transmitted to the user, while data for other non-relevant cubes or cells are totally ignored, which then avoid computation load to explode when the number of users increases in the stadium.

It is to be noted, the aforementioned approaches or embodiments are merely some examples for minimizing the data processing and/or transmission. Other certain approaches for reduced data processing and/or transmission are also possible and are contemplated in the present disclosure.

User Experience

As described earlier, the scan data provided by the scanning devices 702 can be used to provide a presentation of the football game to one or more viewers (e.g., via a virtual reality headset, a TV, a mobile phone, etc.). In one example, the presentation corresponds to a photorealistic 3D rendering of the football game. In some examples, the presentation may correspond to a mixed-reality presentation of the football game. For example, supplemental virtual content can be provided with the photorealistic 3D rendering of the football game. In one example, player names, numbers, and/or stats may be displayed next to one or more players in the football game. In another example, a ring may be displayed around (or under) the player who has possession of the football.

In some embodiments, the scan data provided by the scanning devices 702 can be used to generate a virtual presentation representing the live-action football game. For example, the scan data may be fed to a rendering engine that is configured to generate a virtual representation of the football game. The virtual representation may include virtual avatars that represent the movements and actions of the actual players in the football game. In some examples, the scan data and/or virtual representation can be used for off-field reviews of on-field events (e.g., official rulings). For example, the scan data and/or virtual representation may be used to confirm or overturn controversial rulings made by referees during the game (e.g., fouls, goals, etc.).

In addition to live-action sporting events, the reality capture system 700 can be used in a variety of different environments. For example, the reality capture system 700 may be deployed in a theatre or concert venue to capture a musical or theatrical performance. In one example, the scan data provided by the scanning devices 702 can be used to provide a presentation of the performance (e.g., in conjunction with additional sensors, such as microphones). In one example, the presentation corresponds to a photorealistic 3D rendering of the performance. In some examples, the presentation may correspond to a mixed-reality presentation of the performance. For example, supplemental virtual content can be provided with the photorealistic 3D rendering of the performance. In one example, song titles, lyrics, and other information may be displayed next to one or more performers or in designated areas of the venue. In some embodiments, the scan data provided by the scanning devices 702 can be used to generate a virtual presentation representing the performance. For example, the scan data may be fed to a rendering engine that is configured to generate a virtual representation of the performance. The virtual representation may include virtual avatars that represent the movements and actions of the actual performers. In some examples, the virtual representation of the performance can be included in a video game or another virtual environment (e.g., Metaverse).

In another example, the reality capture system 700 may be deployed in an office building (or space) to capture workplace interactions. In one example, the scan data provided by the scanning devices 702 can be used to generate a mixed-reality representation of the workplace. The mixed-reality representation may be provided to one or more remote workers, allowing the remote worker(s) to observe and interact in the workplace. In some examples, supplemental virtual content can be provided with a photorealistic 3D rendering of the workplace. For example, worker names, status (e.g., busy, free, etc.), scheduling availability, and other information may be displayed next to workers or in designated areas of the workplace. In certain examples, dialogue may be displayed when an in-office worker is communicating with a remote worker or when two or more remote workers are communicating. In some embodiments, the scan data provided by the scanning devices 702 can be used to generate a virtual representation of the workplace. For example, the scan data may be fed to a rendering engine that is configured to generate a virtual representation of the workplace (e.g., a virtual office). The virtual representation may include virtual avatars that represent the movements and actions of the workers in the workplace.

In some embodiments, the reality capture system 700 may also allow a reconstruction of interesting events for replay using the 3D photorealistic image and point-cloud data. For example, through event reconstruction, a replay of an event may be quickly put together and broadcast to the audience in a short period of time. Additionally or alternatively, quick referral of reconstructed events may allow a gameplay analysis in real-time or umpiring decision in a short period of time.

System Embodiments

In embodiments, aspects of the techniques described herein may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
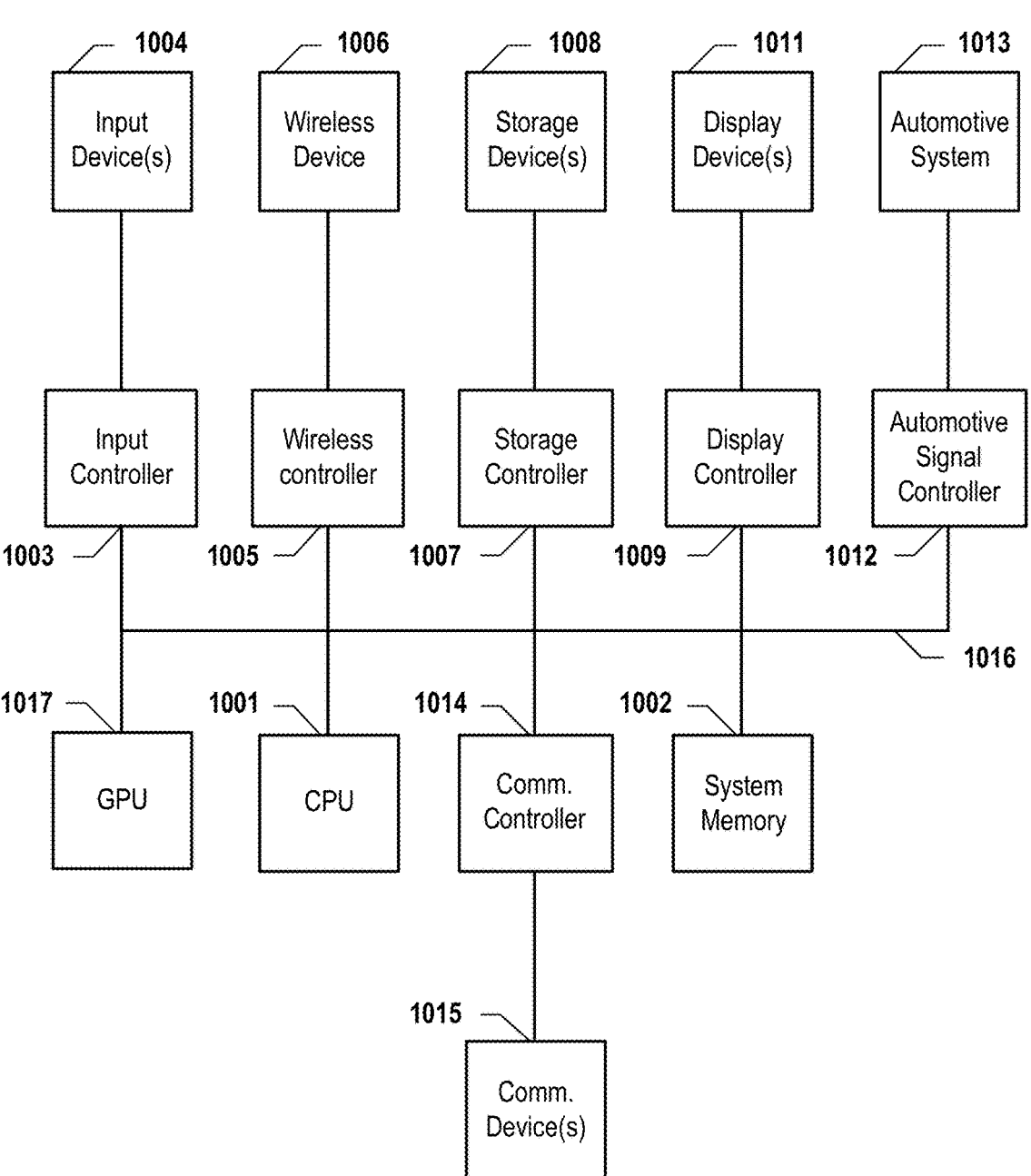
FIG. 10 is a block diagram of a computing device/information handling system, in accordance with some embodiments.

FIG. 10 depicts a simplified block diagram of a computing device/information handling system (or computing system) according to embodiments of the present disclosure. It will be understood that the functionalities shown for system 1000 may operate to support various embodiments of an information handling system—although it shall be understood that an information handling system may be differently configured and include different components.

As illustrated in FIG. 10, system 1000 includes one or more central processing units (CPU) 1001 that provides computing resources and controls the computer. CPU 1001 may be implemented with a microprocessor or the like, and may also include one or more graphics processing units (GPU) 1017 and/or a floating point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. System 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the techniques described herein. Storage device(s) 1008 may also be used to store processed data or data to be processed in accordance with some embodiments. System 1000 may also include a display controller 1009 for providing an interface to a display device 1011, which may be a cathode ray tube (CRT), a thin film transistor (TFT) display, or other type of display. The computing system 1000 may also include an automotive signal controller 1012 for communicating with an automotive system 1013. A communications controller 1014 may interface with one or more communication devices 1015, which enables system 1000 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that have computer code thereon for performing various computer-implemented operations. The media and computer code may be those specially designed and constructed for the purposes of the techniques described herein, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into submodules or combined together.

Terminology

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, and wireless connections.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations

What is claimed is:

1. A light detection and ranging (LiDAR) detection method comprising:

scanning, by a LiDAR system comprising a LiDAR device, a field-of-view during one or more time periods to generate return signal data representing reflections of emitted LiDAR signals from objects within the field-of-view;

scanning, by a digital camera mounted on a same gimbal as the LiDAR device such that the camera and the LiDAR device share a common optical axis and simultaneously scan a same field-of-view;

aggregating return signal data generated by the LiDAR device during the one or more time periods;

capturing digital image data of the field-of-view from the camera during the one or more time periods;

identifying one or more fiducial markers within the field-of-view based on the digital image data captured by the camera;

associating each identified fiducial marker in the digital image data with a corresponding region or feature in the aggregated return signal data from the LiDAR device based on a spatial correspondence provided by the shared optical axis and simultaneous scanning of the LiDAR device and the digital camera;

comparing each of the identified fiducial markers to a respective reference fiducial marker of a plurality of reference fiducial markers;

detecting, based on the comparison, miscalibration of an extrinsic parameter associated with a position and/or an orientation of the LiDAR device; and initiating an action to remediate the detected miscalibration of the extrinsic parameter.

2. The method of claim 1, wherein scanning the field-of-view during the one or more time periods comprises:

emitting, by one or more transmitters, one or more optical signals; and receiving, by one or more receivers, one or more return signals corresponding to the one or more optical signals, wherein each of the one or more LiDAR devices includes at least one of the one or more transmitters and at least one of the one or more receivers.

3. The method of claim 1, wherein the return signal data are derived from the one or more return signals and comprise a point cloud of measurements corresponding to the one or more optical signals.

4. The method of claim 3, wherein the return signal data comprise one or more measurements of range from the LiDAR system to one or more objects in an environment of the LiDAR system.

5. The method of claim 1, wherein the LiDAR system includes and/or accesses the plurality of reference fiducial markers and wherein the plurality of reference fiducial markers comprise data representing visual attributes of objects of standardized shapes and/or sizes.

6. The method of claim 5, wherein the objects of standardized shapes and/or sizes comprise field markings and/or fixtures.

7. The method of claim 1, wherein comparing each of the identified fiducial markers to the respective reference fiducial marker comprises:

for each of the identified fiducial markers, selecting the respective reference fiducial marker based on data representing visual attributes of the respective identified fiducial marker.

8. A light detection and ranging (LiDAR) detection method comprising:

scanning, by a LiDAR system comprising one or more LiDAR devices, a field-of-view during one or more time periods;

aggregating return signal data obtained during the one or more time periods;

identifying one or more fiducial markers represented by the aggregated return signal data;

comparing each of the identified fiducial markers to a respective reference fiducial marker of a plurality of reference fiducial markers;

detecting, based on the comparison, miscalibration of an extrinsic parameter associated with a position and/or an orientation of at least one of the one or more LiDAR devices; and initiating an action to remediate the detected miscalibration of the extrinsic parameter;

wherein comparing each of the identified fiducial markers to the respective reference fiducial marker comprises:

identifying a distortion based on a difference between data representing one or more visual attributes of the identified fiducial marker and data representing one or more visual attributes of the respective reference fiducial marker; and comparing the distortion to a distortion threshold.

9. The method of claim 8, wherein initiating the action to remediate the detected miscalibration of the extrinsic parameter comprises:

generating an alert recommending recalibration of one or more extrinsic parameters of the LiDAR system.

10. The method of claim 8, wherein the distortion comprises a difference between a length, a width, and/or a height of the identified fiducial marker and the respective reference fiducial marker or a ratio between the length, the width, and/or the height of the identified fiducial marker and the respective reference fiducial marker.

11. The method of claim 8, wherein a type of the distortion corresponds to whether the distortion is a difference between a length, a width, and/or a height of the identified fiducial marker and the respective reference fiducial marker.

12. The method of claim 8, wherein the distortion comprises an average distortion for a subset of the one or more identified fiducial markers, wherein each identified fiducial marker in the subset of the one or more identified fiducial markers corresponds to a particular reference fiducial marker.

13. A LiDAR system comprising:

a LiDAR device configured to scan a field-of-view during one or more time periods and to generate return signal data representing reflections of emitted LiDAR signals from objects within the field-of-view;

a digital camera mounted on a same gimbal as the LiDAR device such that the camera and the LiDAR device share a common optical axis and simultaneously scan a same field-of-view; and a processing device configured to:

aggregate the return signal data generated by the LiDAR device during the one or more time periods;

capture digital image data of the field-of-view from the camera during the one or more time periods;

identify one or more fiducial markers within the field-of-view based on the digital image data captured by the camera;

associate each identified fiducial marker in the digital image data with a corresponding region or feature in the aggregated return signal data from the LiDAR device based on a spatial correspondence provided by the shared optical axis and simultaneous scanning of the LiDAR device and the digital camera;

compare each of the identified fiducial markers to a respective reference fiducial marker of a plurality of reference fiducial markers;

detect, based on the comparison, miscalibration of an extrinsic parameter associated with a position and/or an orientation of the LiDAR device; and initiate an action to remediate the detected miscalibration of the extrinsic parameter.

14. The system of claim 13, wherein the one or more LiDAR devices are configured to scan a field-of-view during one or more time periods by:

emitting, by one or more transmitters, one or more optical signals; and receiving, by one or more receivers, one or more return signals corresponding to the one or more optical signals, wherein each of the one or more LiDAR devices includes at least one of the one or more transmitters and at least one of the one or more receivers.

15. The system of claim 13, wherein the return signal data are derived from the one or more return signals and comprise a point cloud of measurements corresponding to the one or more optical signals.

16. The system of claim 13, wherein the processing device is configured to compare each of the identified fiducial markers to the respective reference fiducial marker of the plurality of reference fiducial markers by:

selecting, for each of the identified fiducial markers, the respective reference fiducial marker based on data representing visual attributes of the respective identified fiducial marker.

17. A LiDAR system comprising:

one or more LiDAR devices configured to scan a field-of-view during one or more time periods; and a processing device configured to:

aggregate return signal data obtained during the one or more time periods;

identify one or more fiducial markers represented by the aggregated return signal data;

compare each of the identified fiducial markers to a respective reference fiducial marker of a plurality of reference fiducial markers;

detect, based on the comparison, miscalibration of an extrinsic parameter associated with a position and/or an orientation of at least one of the one or more LiDAR devices; and initiate an action to remediate the detected miscalibration of the extrinsic parameter;

wherein the processing device is configured to compare each of the identified fiducial markers to the respective reference fiducial marker of the plurality of reference fiducial markers by:

identifying a distortion based on a difference between data representing one or more visual attributes of the identified fiducial marker and data representing one or more visual attributes of the respective reference fiducial marker; and comparing the distortion to a distortion threshold.

18. The system of claim 17, wherein the processing device is configured to initiate the action to remediate the detected miscalibration of the extrinsic parameter by:

generating an alert recommending recalibration of one or more extrinsic parameters of the LiDAR system.

19. The system of claim 17, wherein the distortion comprises a difference between a length, a width, and/or a height of the identified fiducial marker and the respective reference fiducial marker or a ratio between the length, the width, and/or the height of the identified fiducial marker and the respective reference fiducial marker.

20. The system of claim 17, wherein a type of the distortion corresponds to whether the distortion is a difference between a length, a width, and/or a height of the identified fiducial marker and the respective reference fiducial marker.

21. The system of claim 17, wherein the distortion comprises an average distortion for a subset of the one or more identified fiducial markers, wherein each identified fiducial marker in the subset of the one or more identified fiducial markers corresponds to a particular reference fiducial marker.

22. The system of claim 13, wherein the system comprises a plurality of LiDAR devices and a corresponding plurality of digital cameras disposed at fixed locations around an environment, each digital camera being mounted on a same gimbal with a corresponding LiDAR device such that the camera and the LiDAR device share a common optical axis and simultaneously scan a same field-of-view.

23. The system of claim 22, wherein the processing device is further configured to perform both temporal and spatial calibration across the plurality of LiDAR devices and cameras, including synchronizing data acquisition using a precision time protocol or generalized precision time protocol and aligning the positions and orientations of the devices relative to a reference coordinate system.

24. The system of claim 22, wherein the processing device is further configured to:

generate a three-dimensional point cloud of the environment from the return signal data aggregated from the plurality of LiDAR devices;

overlay color image data from the plurality of digital cameras onto the three-dimensional point cloud; and generate a photorealistic or colorized three-dimensional point cloud or video of the environment based on the overlaid color image data and point cloud.

* * * * *